US008033215B1

United States Patent
Wright

(10) Patent No.: US 8,033,215 B1
(45) Date of Patent: Oct. 11, 2011

(54) METHOD FOR DESIGNING AND EXECUTING ENHANCED DESIGNS ON A SHEET MATERIAL

(76) Inventor: Stephen John Wright, Marina Del Rey, CA (US)

( * ) Notice: Subject to any disclaimer, the term of this patent is extended or adjusted under 35 U.S.C. 154(b) by 1046 days.

(21) Appl. No.: 11/897,069

(22) Filed: Aug. 28, 2007

(51) Int. Cl.
*B31F 1/07* (2006.01)
(52) U.S. Cl. ........... 101/32; 101/13; 101/29; 101/31
(58) Field of Classification Search ........ 101/12, 101/13, 29, 31, 32
See application file for complete search history.

(56) References Cited

U.S. PATENT DOCUMENTS

| | | | | |
|---|---|---|---|---|
| 5,396,279 | A | * | 3/1995 | Vossen ............... 348/95 |
| 5,517,910 | A | * | 5/1996 | Skahan ............. 101/27 |
| 6,247,011 | B1 | | 6/2001 | Jecha et al. |
| 7,054,708 | B1 | | 5/2006 | Aamodt et al. |
| 2001/0000860 | A1 | * | 5/2001 | Smith et al. ........ 101/32 |
| 2002/0139255 | A1 | * | 10/2002 | He et al. ............ 101/32 |
| 2004/0073446 | A1 | | 4/2004 | Snow |
| 2005/0257594 | A1 | * | 11/2005 | Hutchison et al. ........ 72/482.93 |
| 2007/0084360 | A1 | * | 4/2007 | Dewitt ........... 101/32 |
| 2007/0089624 | A1 | | 4/2007 | Allen |
| 2008/0202361 | A1 | * | 8/2008 | Sarnstrom ............ 101/3.1 |
| 2008/0250958 | A1 | * | 10/2008 | Ruggiero .......... 101/401.1 |

OTHER PUBLICATIONS

Ellison "Shaping Education" Catalog 2007-2008 Lake Forest, CA 92630-8804.
Sizzix Fall Catalog 2006 (downloaded four www.sizzix.com) Lake Forest, CA 92630.
American Stationary Catalog Autumn 2007 100 North Park Avenue, Peru, Indiana 46970-1702.
Provo Craft "Cuttlebury"—Web Page Printout attached. Printed Nov. 4, 2007, UT 84660.

* cited by examiner

*Primary Examiner* — Ren Yan
*Assistant Examiner* — David Banh

(57) ABSTRACT

A method to impart physical enhancements to a sheet material having a printed image such that the physical enhancements are in alignment with the graphical features of the printed image as would be complimentary to the physical enhancements and thereby forming an enhanced image. One embodiment has a computer based design environment allowing a user to develop a scaled virtual representation of an enhanced image through a graphical user interface by assembling a plurality of virtual objects representing forms and dimensions of preexisting or preconceived enhancement components, forms and dimensions of preexisting or preconceived assembly components, forms and dimensions of physical enhancements imparted to sheet material by preexisting or preconceived enhancement components, forms and dimensions of graphical enhancements as would be printed to sheet material and complimentary to physical enhancements and forms of images. Images and graphical enhancements are printed to sheet material to create a printed image and assembly and enhancement components assembled in accordance with assembly template derived from virtual design such that a custom die is formed specific to the printed image. Custom die is applied to printed image under a predetermined force such as to apply physical enhancements to printed image in accordance with virtual design.

16 Claims, 32 Drawing Sheets

210
Import libraries of Virtual Enhancement Components and Virtual Sheet Materials into Computer Based Design Environment or create libraries within Computer Based Design Environment

220
Import Virtual Images to Computer Based Design Environment or create Virtual Images within Computer Based Design Environment

230
Select Virtual Sheet Material, Virtual Enhancement Components and Virtual Images in Computer Based Design Environment using Graphical User Interface. Virtual Sheet Material defines Virtual Design Space

240
Arrange Virtual Enhancement Components and Virtual Images in Virtual Design Space, and select Graphical Enhancements from Predetermined options to create Virtual Design and associated Virtual Graphic and Virtual Assembly Template

250
Print Virtual Graphic to Sheet Material to create Printed Image

260
Print Virtual Assembly Template to create Assembly Template

270
Affix Assembly Template to Assembly Components in accordance with Predetermined Location

280
Assemble Custom Die in accordance with Assembly Template

290
Orient and position Printed Image in accordance with Predetermined Location and apply Predetermined Force to create Enhanced Image

Fig 8

310
Import libraries of Virtual Enhancement Components and Virtual Sheet Materials into Computer Based Design Environment or create libraries within Computer Based Design Environment 320
Import Virtual Images to Computer Based Design Environment or create Virtual Images within Computer Based Design Environment 330
Select Virtual Sheet Material, Virtual Enhancement Components and Virtual Images in Computer Based Design Environment using Graphical User Interface. Virtual Sheet Material defines Virtual Design Space 340
Select Graphical Enhancements from Predetermined Options presented by Virtual Enhancement Components and position Virtual Images in Virtual Design Space to create Virtual Design and associated Virtual Graphic and Virtual Assembly Template 350
Print Virtual Graphic to Sheet Material to create Printed Image 360
Orient and position Printed Image in accordance with Predetermined Location and apply Predetermined Force to create Enhanced Image

Fig. 26

METHOD FOR DESIGNING AND EXECUTING ENHANCED DESIGNS ON A SHEET MATERIAL

FEDERALLY SPONSORED RESEARCH

Not Applicable

SEQUENCE LISTING OR PROGRAM

Not Applicable

BACKGROUND

1. Field of Invention

This invention relates to creating custom designs comprising physical enhancements, graphical enhancements as would be complimentary to the physical enhancements, and images manifest on sheet materials.

2. Prior Art

Embossed and die cut areas serve as decorative features on greeting cards, menus, business cards, decorative surrounds and the like. Areas of physical enhancement are arranged to accentuate specific graphical features on a design such as a raised area coinciding with a textual greeting. Tooling used to impart physical enhancements is custom to the printed image. Developing tooling for one off or small production volumes is prohibitively expensive using traditional methods.

Die cut and embossing devices and systems, and libraries of dies, are available from companies such as Ellison, ProvoCraft and Sizzix. These emboss and die cut regions on sheet materials for one-off and small production volume designs. Die cut dies primarily cut shapes from sheet material that are then affixed to other sheet material. Embossing dies impart raised areas or textures to areas of a sheet material. Such die cut and embossing devices and systems offer no integral facility or systemic approach to coordinating areas of graphical enhancements and areas of physical enhancements on a sheet material. Executing a design including embossed and die cut areas and an intricate printed design requires significant trial and error.

Companies such as American Greetings and Hallmark provide on-line services wherein custom images such as photographs are merged with textual greetings and other graphical enhancements. These are subsequently printed and optionally assembled with previously manufactured components such as decorative frame surrounds. There is no integral service for embossing or otherwise physically enhancing the sheet material on which the designs are printed.

Companies such as American Stationary provide embossed stationary, their on-line design process uses standard templates for cards that include embossments such as scroll designs and allow a custom text string to be specified and embossed, or printed, to a predetermined location in the template. The location of the text string is predetermined, has a limited character length and has a preset form such as an initial and surname. The design process is limited to actions such as entering a text string within a text field and selecting colors for the sheet material from a drop down box within a computer based application. There is no provision for freeform positioning of physical enhancements such as the text string, adding graphical enhancements complimentary to the embossed areas such as fill colors and patterns, or incorporating imported graphical designs, photographs and the like within the overall design.

Commercial greeting cards having embossed areas with graphical enhancements and incorporating graphical images are available through retail outlets and are produced in high volumes as a result of the expense of tooling. Tooling for application of the physical enhancements is generally produced by developing a freeform graphical design and using it as a template for designing and developing and manufacturing the die plates from scratch as a distinct and separate process step. U.S. Pat. No. 4,579,708 to Rosart (1986) proposes a relatively cheap way of creating a design from a freeform image, but the process is intricate and requires specialized equipment.

In summary, there is no available systemic and integrated approach to the design and production of a custom design incorporating an image with physically and graphically enhanced regions desirably and coordinately placed on a sheet material. Prior art requires that for an embossing or die cut die be designed and built from scratch at a distinct process step, which is time consuming and costly.

SUMMARY

In accordance with one embodiment a computer based design environment with a graphical user interface allows a user to develop a virtual design representing an enhanced image comprising graphical and physical enhancements in coordination with one or more images, and manifest on a sheet material. The virtual design is a scaled and coordinated visual representation of the enhanced image, and a scaled and coordinated visual representation of an assembly of preexisting or preconceived components used to impart the physical enhancements to the sheet material.

The enhanced design is manifest on a sheet material and has areas of physical enhancement, areas of graphical enhancement as would be complimentary to the areas of physical enhancements, and images. The virtual design is an assembly of preexisting virtual objects selected and arranged within the graphical user interface. Virtual objects represent the aesthetic features of the enhanced image in coordination with the tooling used to impart the physical enhancements to the sheet material.

Tooling to impart the physical enhancements is assembled from preexisting or preconceived components. These components are assembly components and enhancement components. Enhancement components impart physical enhancements to the sheet material when assembled and co-joined with assembly components to create a custom die and the sheet material arranged to be in contact with the custom die in a sandwich arrangement and the custom die subject to a predetermined force applied using a die cut or embossing device. Assembly components form supporting structure allowing the enhancement components to be used with die cut and embossing devices and have geometries such that the sheet material can be accommodated and held at an indicated and predetermined location on the assembly components. The geometries of the assembly components and enhancement components are such that the sheet material can be accommodated and held at the predetermined location when the assembly components are assembled with the enhancement components, and also prior to assembly. Assembly components are specific to the dimensions of a sheet material.

Virtual objects are used to represent the form and dimensions of enhancement components, the form and dimensions of physical enhancements thereby imparted to a sheet material, the form and dimensions of graphical enhancements complimentary to the physical enhancements as would form part of the printed image, the form and dimensions of sheet materials, and the form of images. Virtual sheet materials, virtual images and virtual enhancement components are virtual objects. A virtual sheet material represents the form and dimensions of a sheet material such as its texture, fill color, length and width. A virtual image represents an image such as a digital photograph. A virtual enhancement component simultaneously and coordinately represents the form and dimensions of a preexisting or preconceived enhancement component, and the form and dimensions of physical enhancements thereby imparted to a sheet material, and the form and dimensions of graphical enhancements as would be complimentary to the physical enhancements and printed to the sheet material.

A virtual sheet material defines a virtual design space within the graphical user interface and dictates the boundary of the virtual design as the edges of a sheet material dictate a boundary to the sheet material. The virtual sheet material is a scaled representation of the sheet material to which the images, physical enhancements and graphical enhancements will be imparted.

Virtual enhancement components are selected from libraries in the graphical user interface and assembled within the virtual design space and are displayed as geometric forms that are scaled and coordinated representations of the physical enhancements as would manifest on the sheet material, graphical enhancements complimentary to the physical enhancements as would manifest on the sheet material, and the arrangement of enhancement components as would be used to impart the physical enhancements to the sheet material. In one embodiment the physical enhancements and graphical enhancements complimentary to the physical enhancements are selected from predetermined options using menus and palettes presented by the virtual enhancement components through the graphical user interface. Graphical enhancements include but are not limited to geometric shapes overlaid on the represented physical enhancements such as printed outlines having the form of the physical enhancements, and fill colors applied within the printed outlines. Virtual images are also selected sized and positioned within the virtual design space and similarly displayed.

The virtual design provides a virtual graphic and a virtual assembly template. The virtual graphic is a preview of the arrangement of images and graphical enhancements represented by the virtual design as would be printed to a sheet of the sheet material represented by the virtual sheet material. In one embodiment the virtual assembly template is a map of the arrangement of virtual enhancement components as would be printed to one or more sheets of the sheet material represented by the virtual sheet material. The virtual assembly template specifically shows the form, dimensions and locations of the virtual enhancement components within the virtual design space and transforms them to form the map of the enhancement components as would be arranged on the assembly components to assemble the custom die.

The virtual graphic is printed to a sheet of the sheet material to create a printed image. In one embodiment the virtual assembly template suitably transformed is printed to one or more sheets of the sheet material to create an assembly template and the assembly template is positioned on the assembly components in accordance with the predetermined location and the enhancement components co-joined with the assembly components in accordance with the assembly template. The custom die is thereby formed.

The printed image is oriented such as to have the graphical enhancements thereon manifest in a common orientation with the enhancement components co-joined with the assembly components and is held at the predetermined location by the custom die.

The predetermined force is applied using a die cut or embossing device and the physical enhancements are imparted to the printed image.

In one embodiment preexisting enhancement components represented by the virtual enhancement components are reused and new enhancement components and virtual enhancement components are added to the portfolio to fulfill a specific design need. The new components are combined with the preexisting components in execution of the enhanced image.

In summary, using a computer based design environment supporting a graphical user interface virtual objects are selected and positioned in desirable arrangements to create a virtual design. The virtual design is imparted to the sheet material by printing the images and graphical elements of the design and applying a custom die assembled from assembly and enhancement components in accordance with an assembly template derived from the virtual design. The enhanced image is designed and executed without the need for trial and error matching of the form and dimensions of graphical enhancements and physical enhancements, or the need to design and manufacture tooling from scratch specific to a design. Development time and cost is thereby significantly reduced.

DRAWINGS

Figures

In the drawings, like numerals indicate like components.

Figure 7:
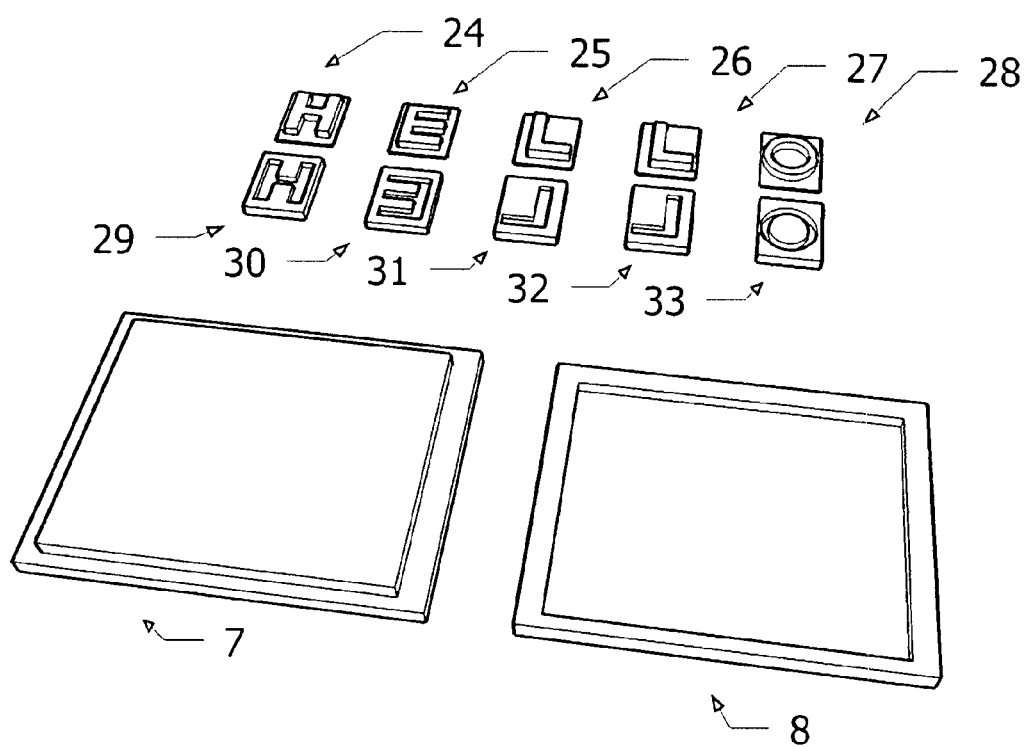
FIG. 7 shows a mating pair of assembly components and a plurality of mating pairs of enhancement components.
Figure 7A:
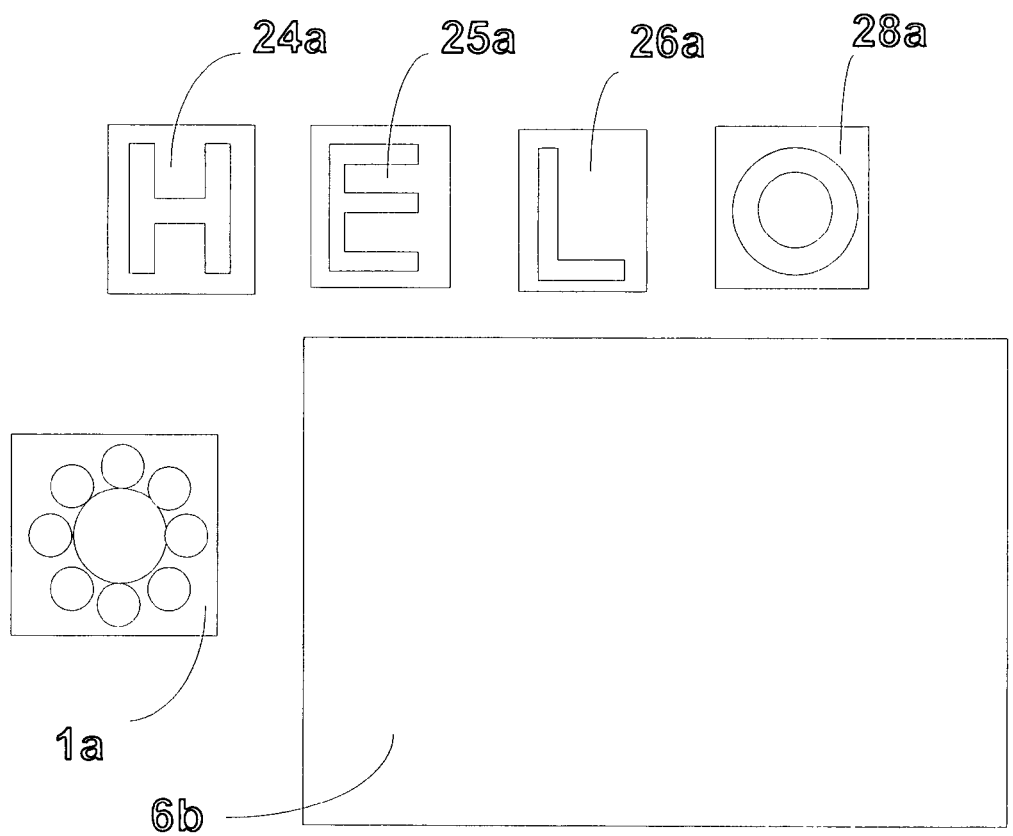

FIG. 7*a* shows representations of virtual objects used to assemble a virtual design.

Figure 7B:
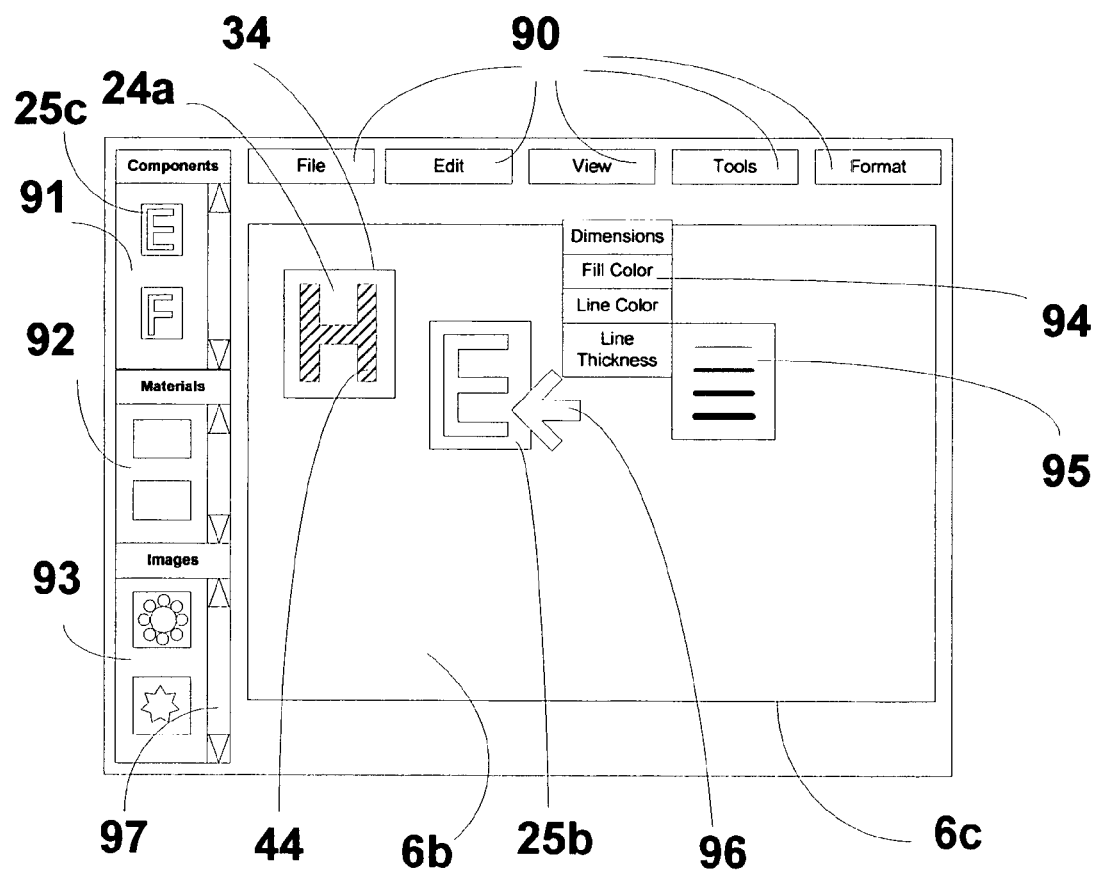

FIG. 7*b* shows one embodiment of the graphical user interface.

FIG. 8 is a method flow chart.

Figure 9:
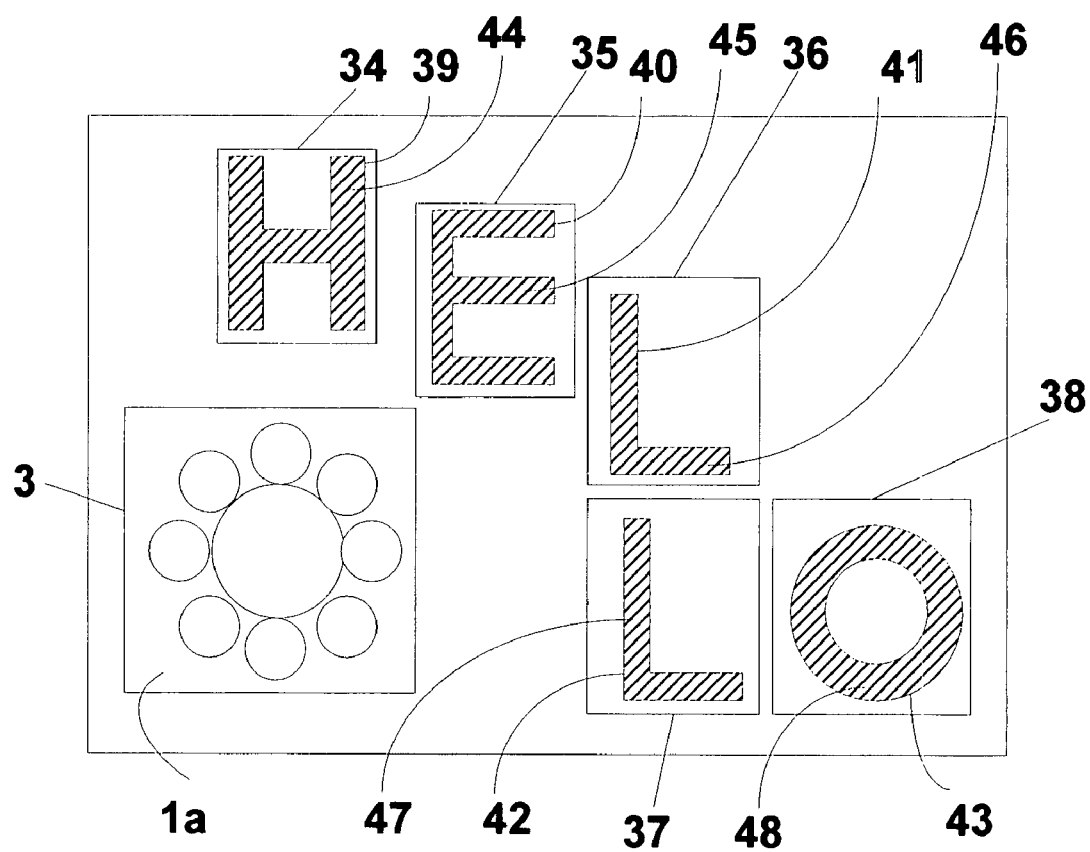

FIG. 9 illustrates a virtual design.

Figure 10:
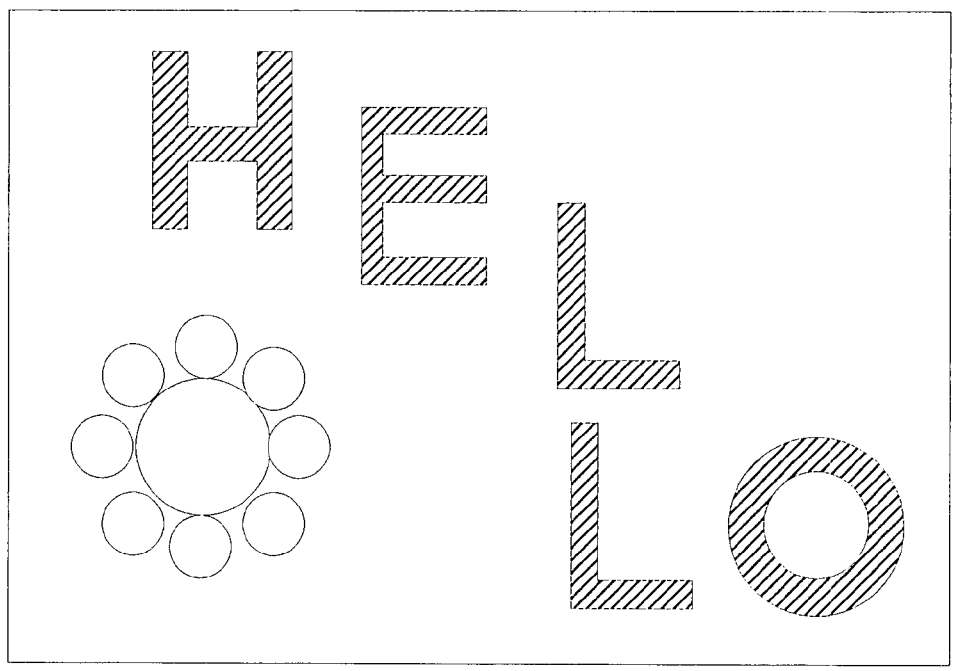

FIG. 10 illustrates a virtual graphic as would be printed to the sheet material to create the printed image.

Figure 11:
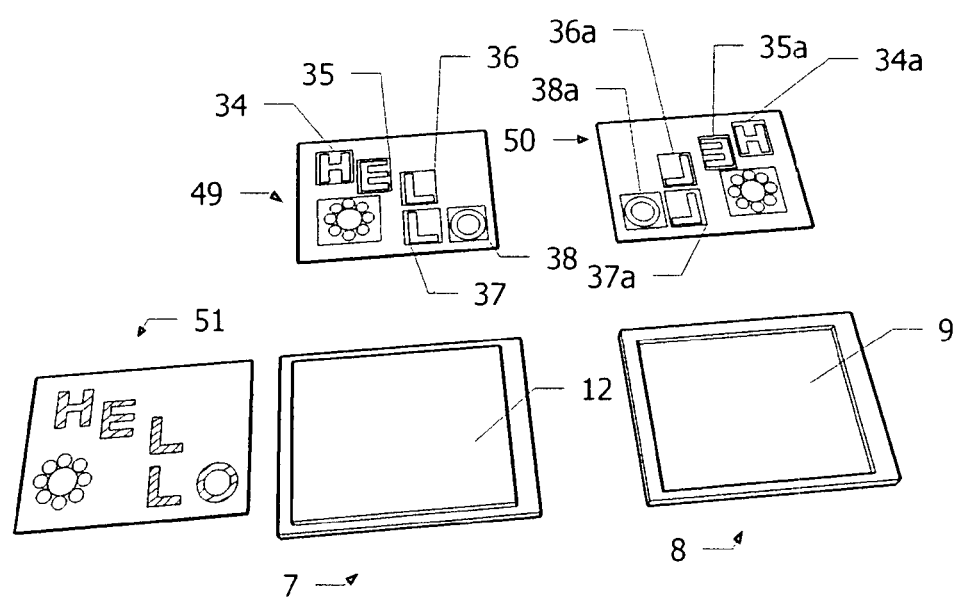

FIG. 11 shows a mating pair of assembly components, the printed image and a male and female assembly template and illustrates the perimeters on the assembly template as would be used to locate the enhancement components.

Figure 12:
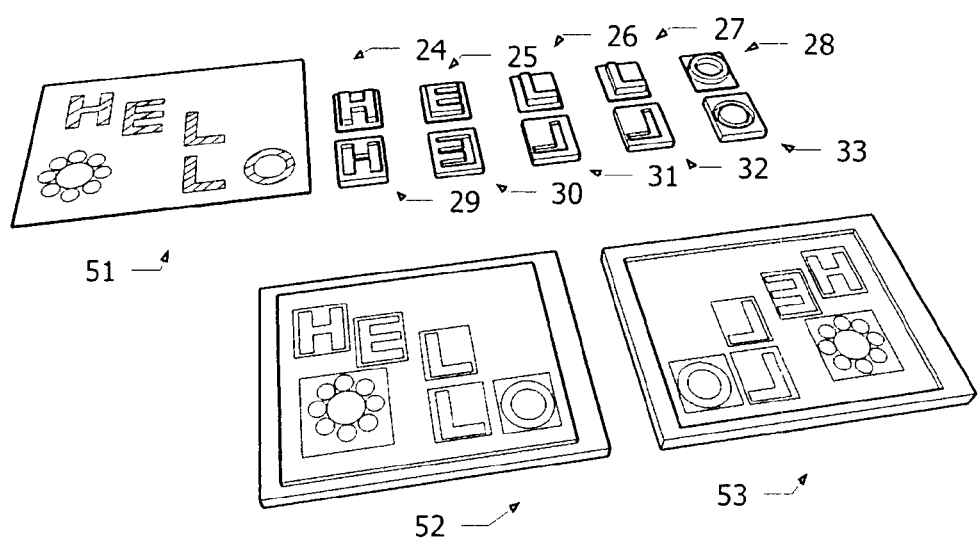

FIG. 12 shows the assembly templates affixed to the assembly components, the printed image and a plurality of enhancement components.

Figure 13:
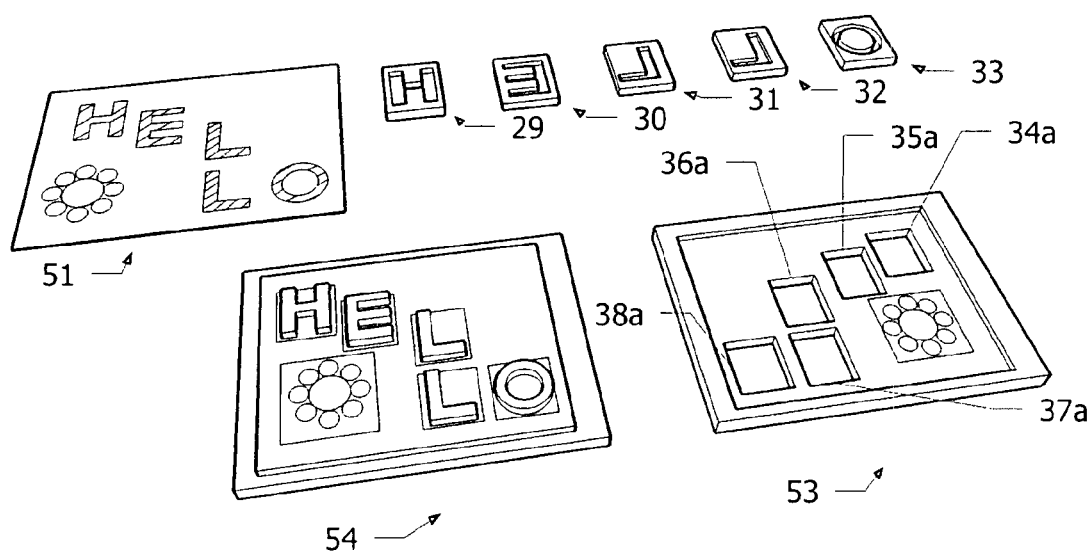

FIG. 13 shows the male enhancement components affixed to the male assembly component in accordance with the male assembly template and voids in the female assembly component resulting from the removal of material in accordance with the female assembly template. The female enhancement components and the printed image are shown.

Figure 14:
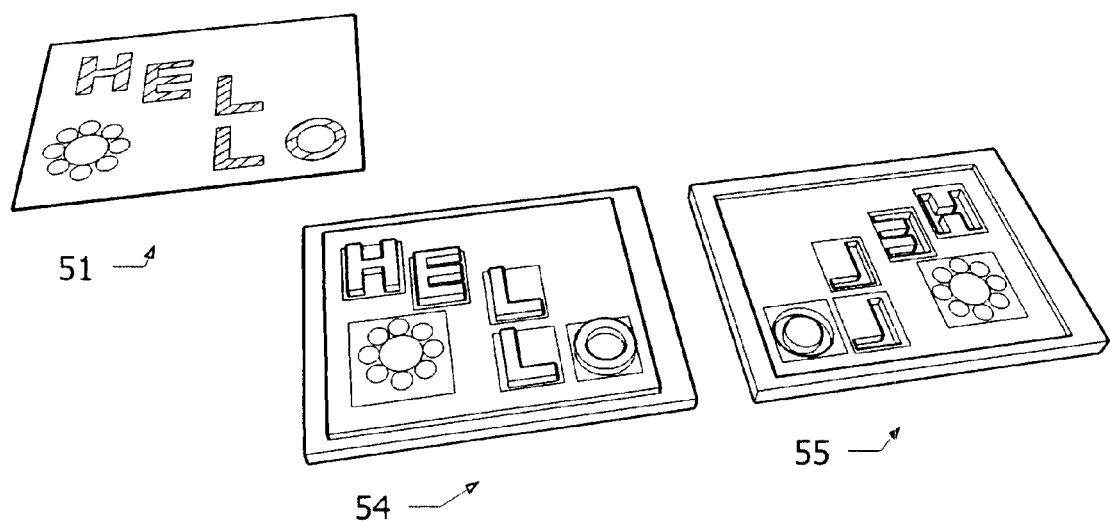

FIG. 14 shows the assembled custom die and the printed image.

Figure 15:
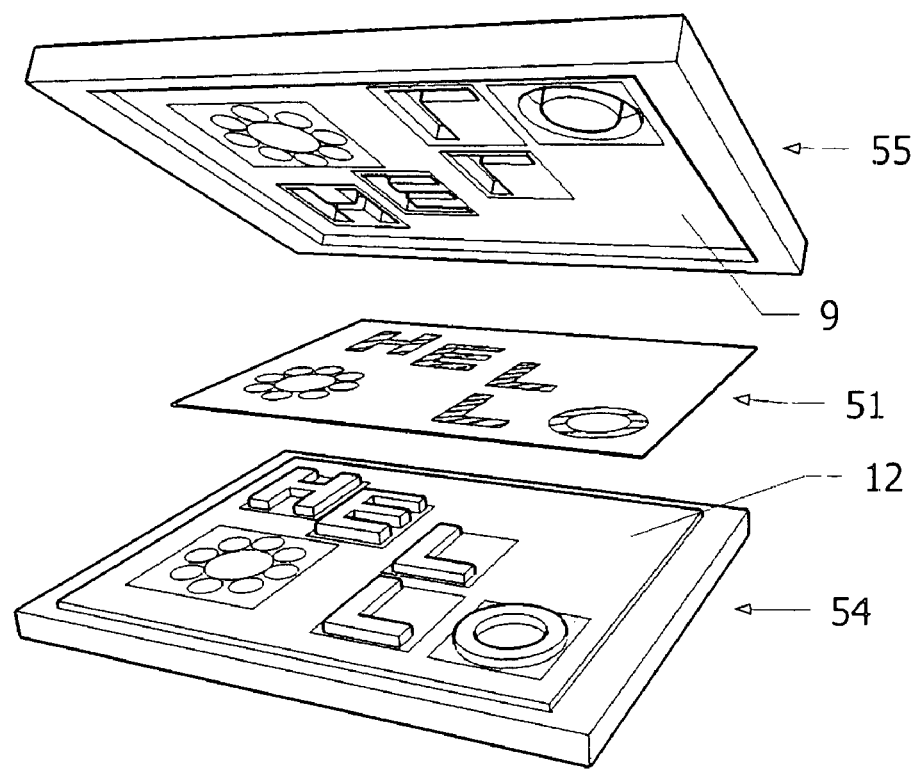

FIG. 15 shows the printed image aligned prior to seating in the recess of the custom die and application of the predetermined force.

Figure 16:
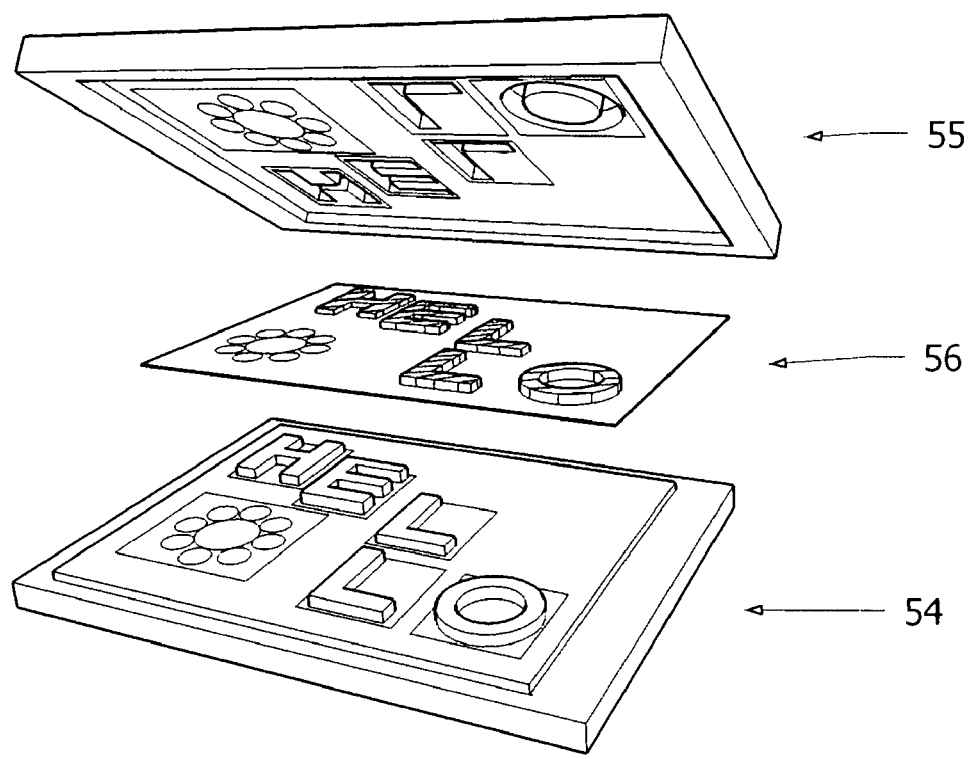

FIG. 16 shows the enhanced image after application of the predetermined force and opening of the custom die.

Figure 17:
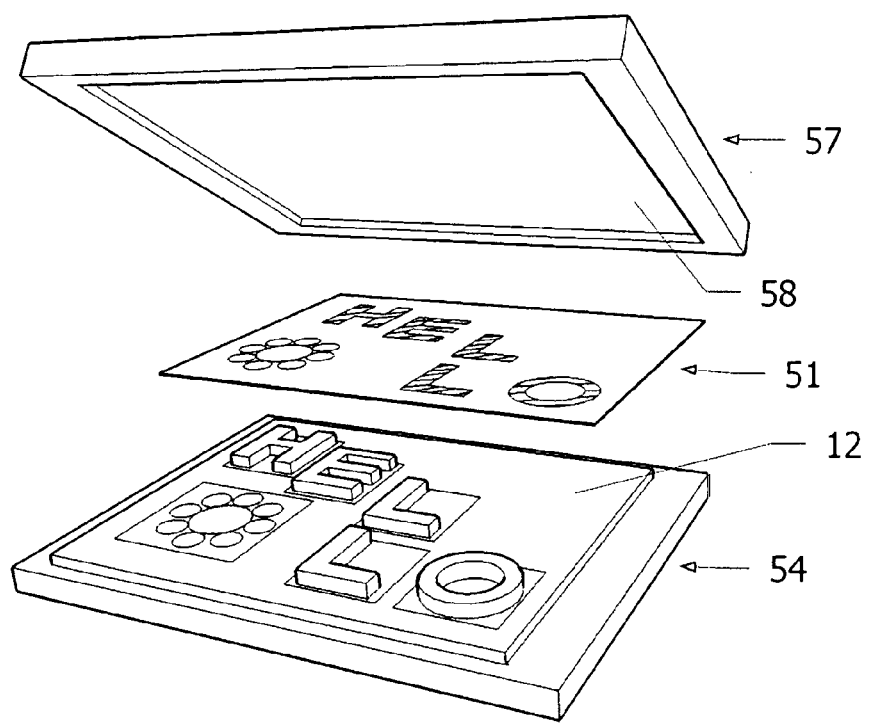

FIG. 17 shows an embodiment with a resilient female assembly component.

Figure 18:
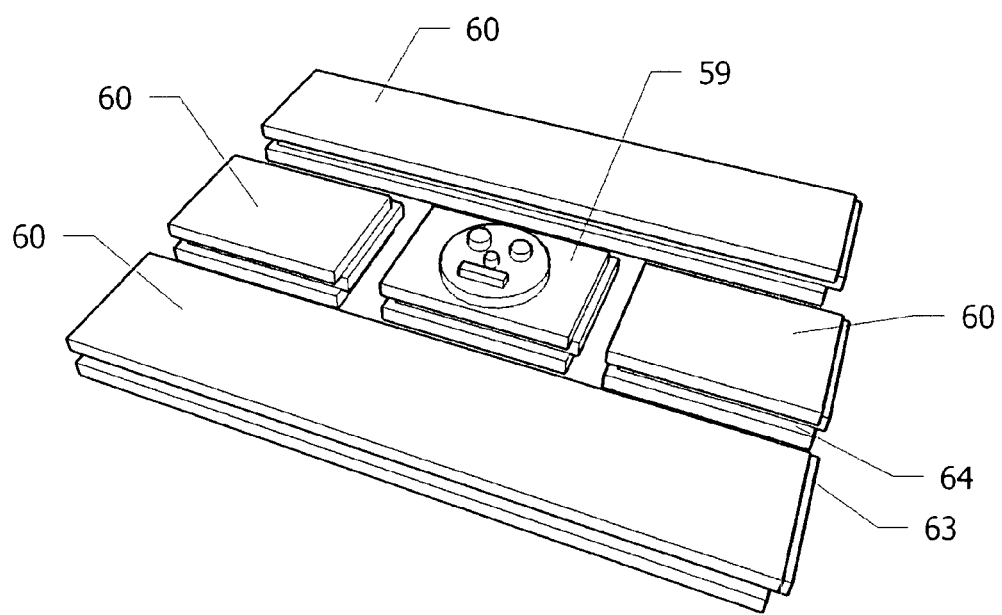

FIG. 18 shows a plurality of enhancement components having tongue and groove arrangements.

Figure 19:
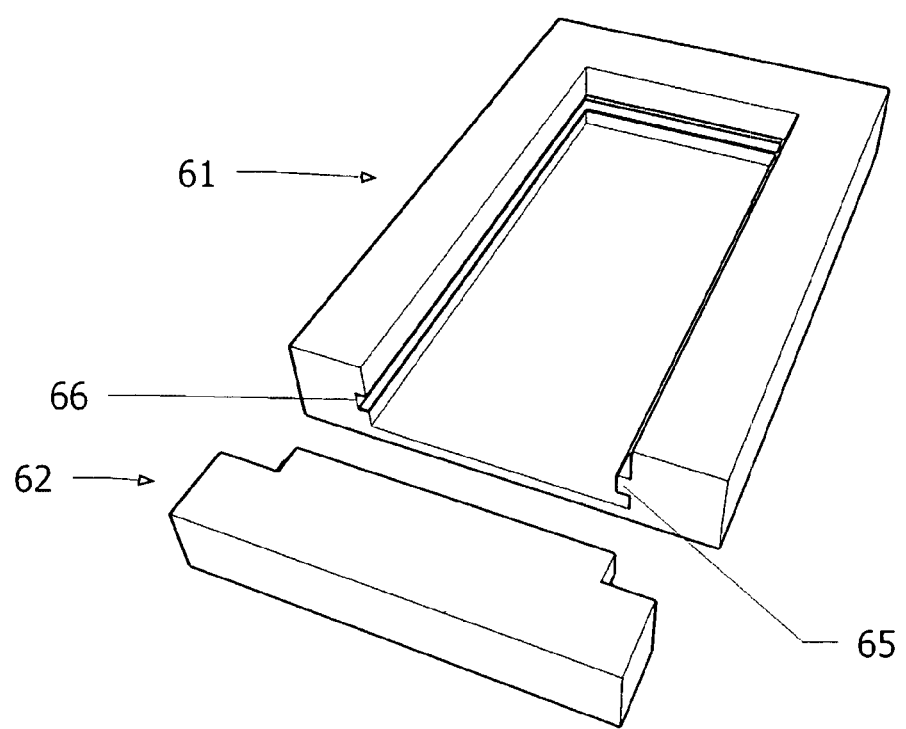

FIG. 19 shows an assembly frame and assembly frame closure.

Figure 19A:
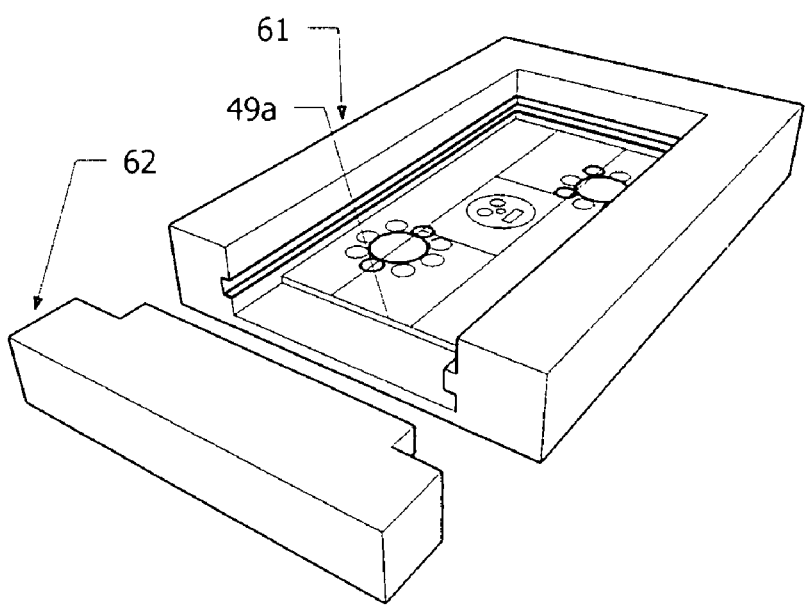

FIG. 19a shows an assembly frame having an affixed assembly template, and the assembly frame closure.

Figure 20:
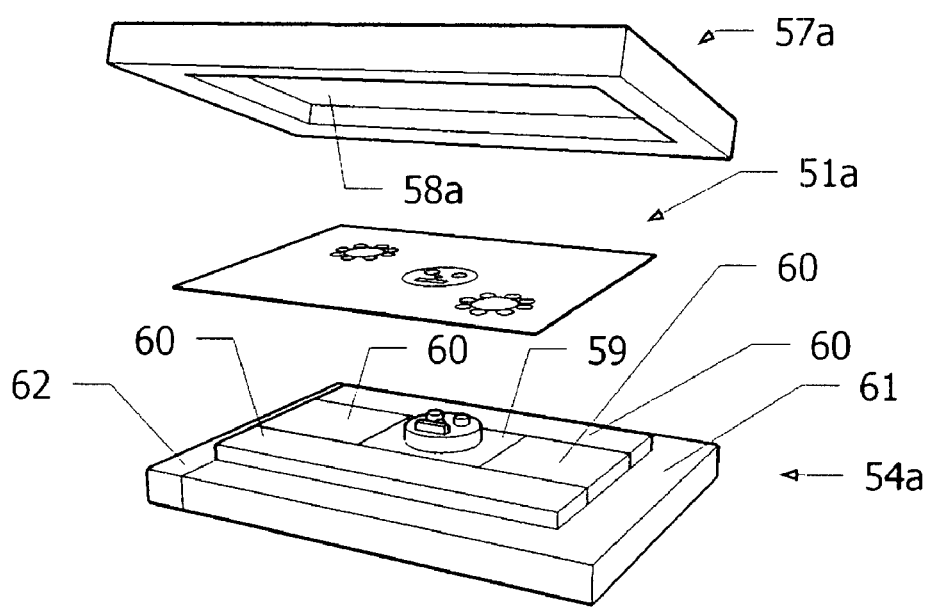

FIG. 20 shows the enhancement components assembled into the assembly frame and shows a resilient female assembly component and a printed image.

Figure 21:
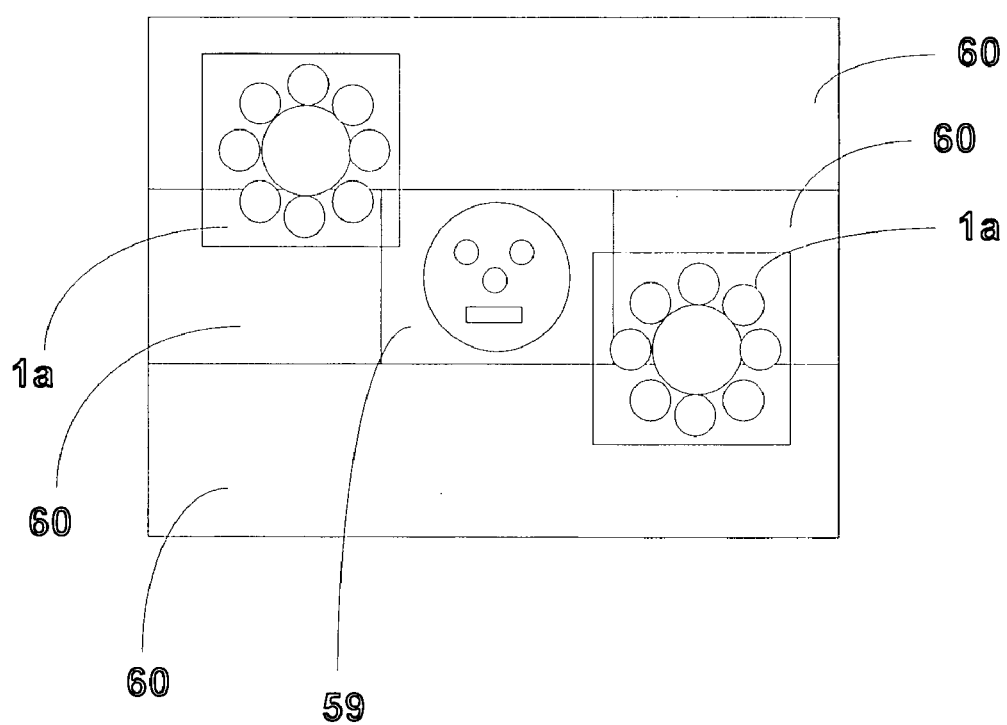

FIG. 21 shows a virtual design.

Figure 22:
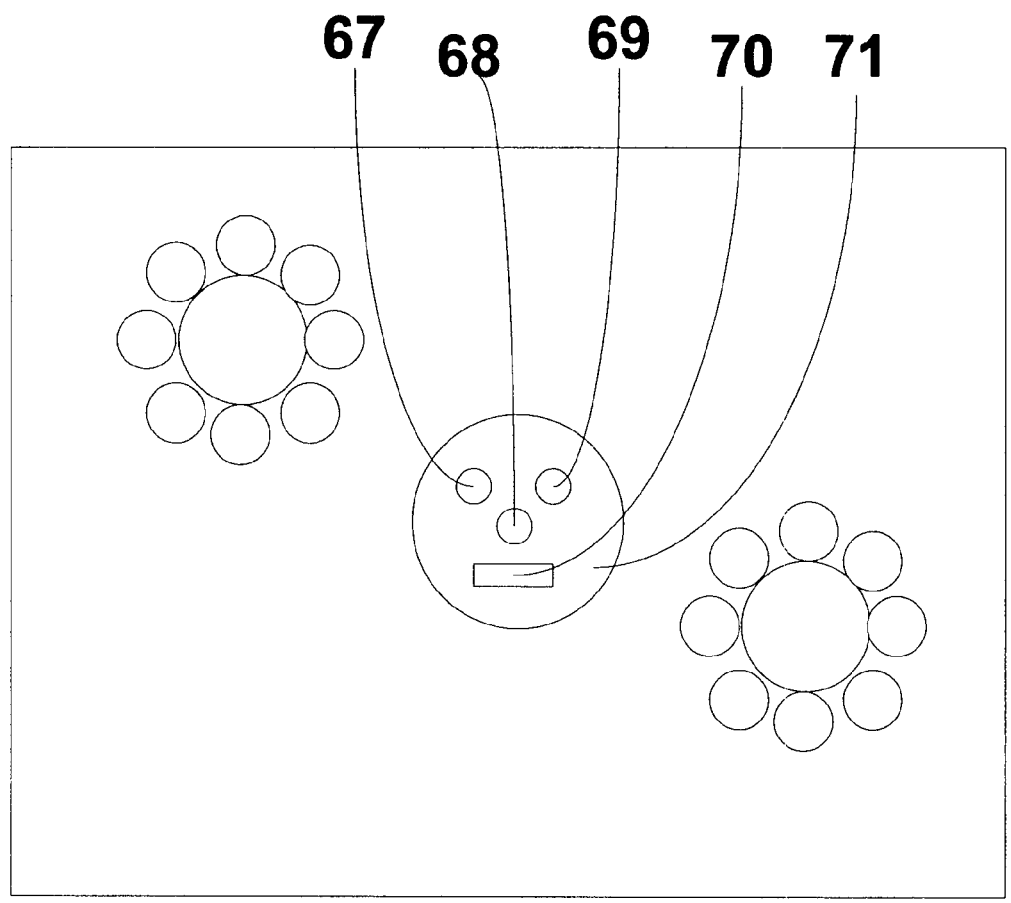

FIG. 22 shows the virtual graphic and indicates regions and boundaries where fill colors, and line thicknesses and colors can be selected.

Figure 23:
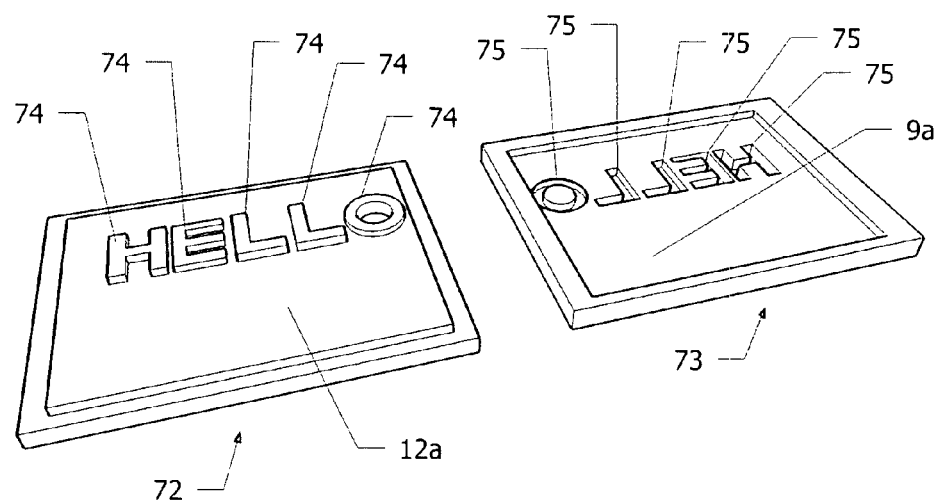

FIG. 23 shows a pair of enhancement components incorporating the assembly components.

Figure 24:
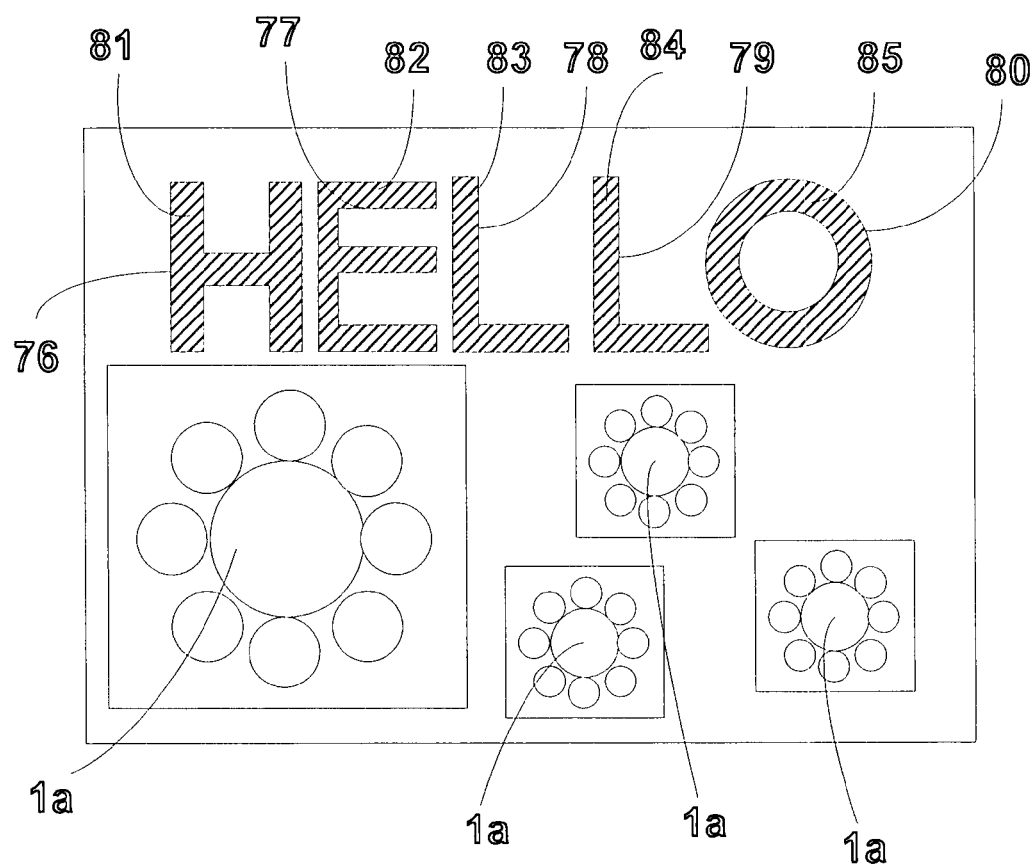

FIG. 24 shows the virtual design and indicates the placement of multiple copies of the virtual image and the areas where fill colors, and line thicknesses and colors can be selected.

Figure 25:
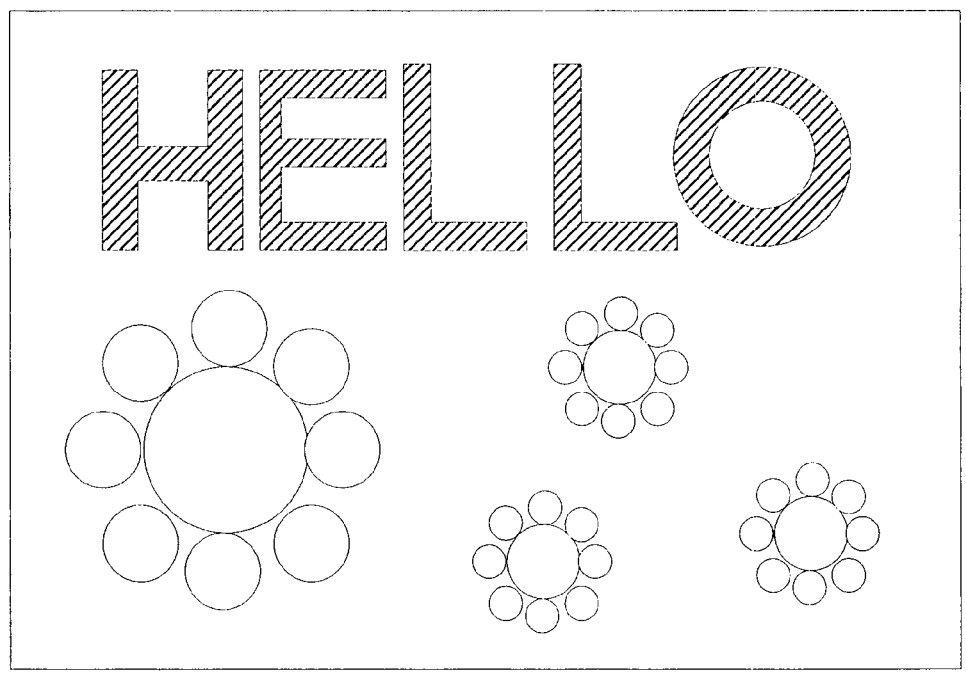

FIG. 25 shows a virtual graphic as would be printed to create a printed image.

FIG. 26 is a method flowchart.

Figure 27:
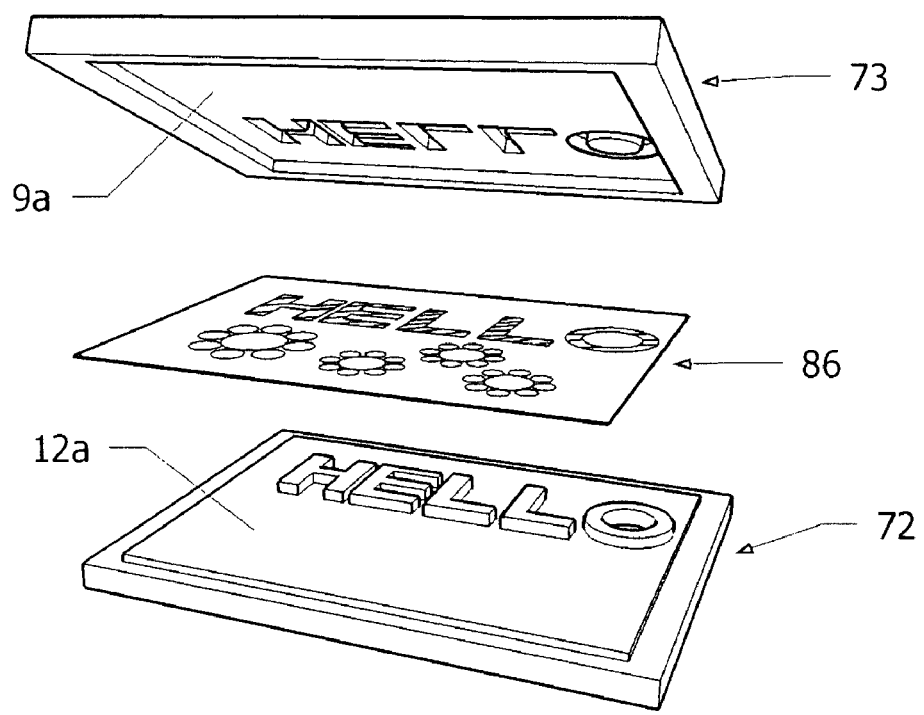

FIG. 27 shows a pair of enhancement components with integral assembly components and a printed image.

Figure 28:
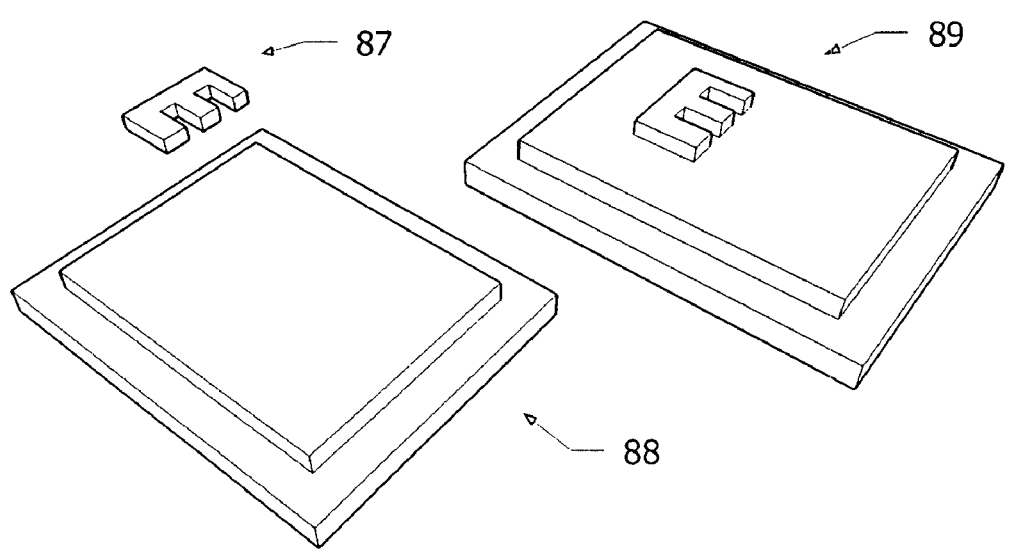

FIG. 28 shows an enhancement component, an assembly component and a custom die male half as would be manufactured using a computer controlled milling machine or rapid laser sintering device.

Figure 29:
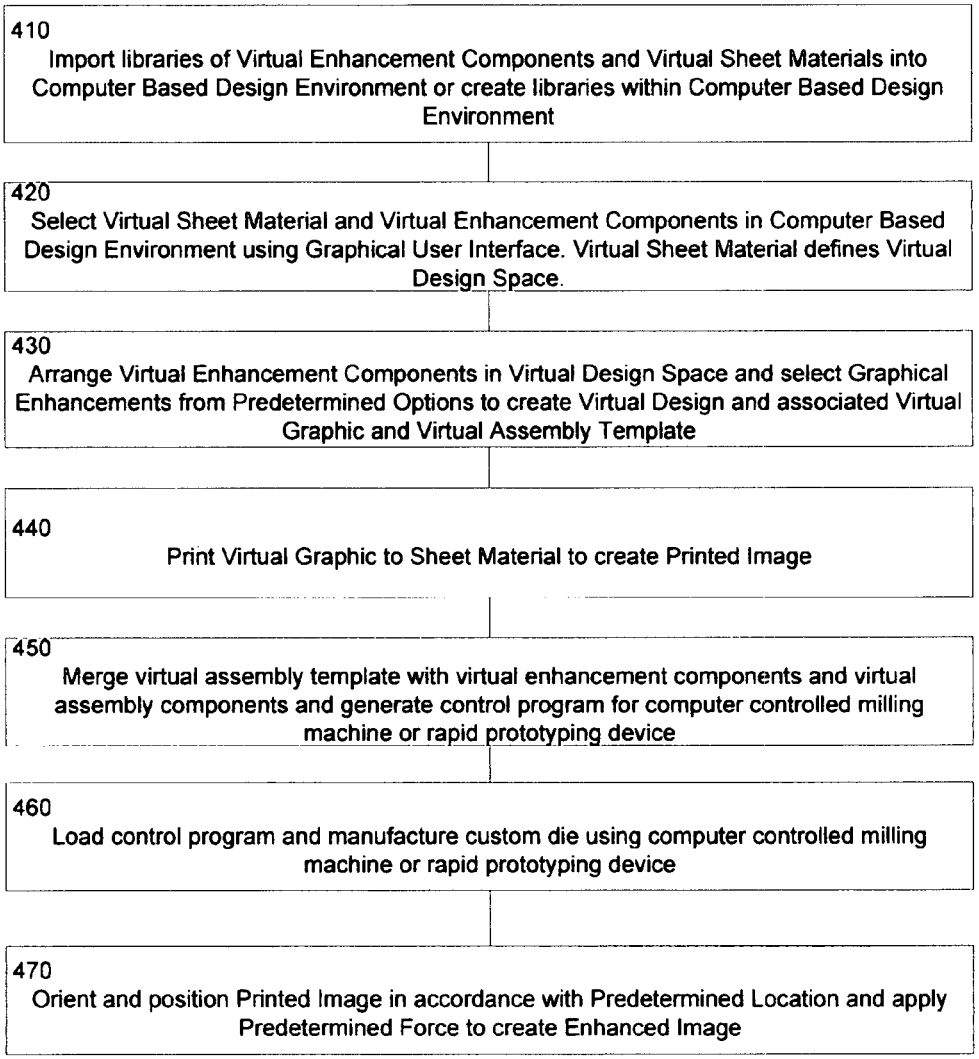

FIG. 29 shows a method flow chart.

DESCRIPTION OF EMBODIMENTS—FIGS. 1, 2, 3, 4, 5, 6, 7, 7a, 7b, 8, 9, 10, 11, 12, 13, 14, 15 & 16

Preferred Embodiment

In the following detailed description of the preferred embodiments, reference is made to the corresponding drawings which form a part thereof, and in which is shown by way of illustration, specific preferred embodiments by which the invention may be practiced. These embodiments are described in sufficient detail to enable those skilled in the art to practice the invention, and it is understood that other embodiments may be utilized and that logical, mechanical and electrical changes may be made without deviating from the spirit and scope of the present invention. The following detailed description is therefore not to be taken in a limiting sense, and the scope of the invention is defined only by the appended claims.

One embodiment is intended to allow a design for an enhanced image to be developed in a computer based design environment and subsequently imparted to a sheet material such as, but not limited to, cardboard or paper. The design comprises one or more images, physical enhancements and graphical enhancements. The design manifest on the sheet material is the enhanced image, and the design represented in the computer based design environment is a virtual design.

Figure 1:
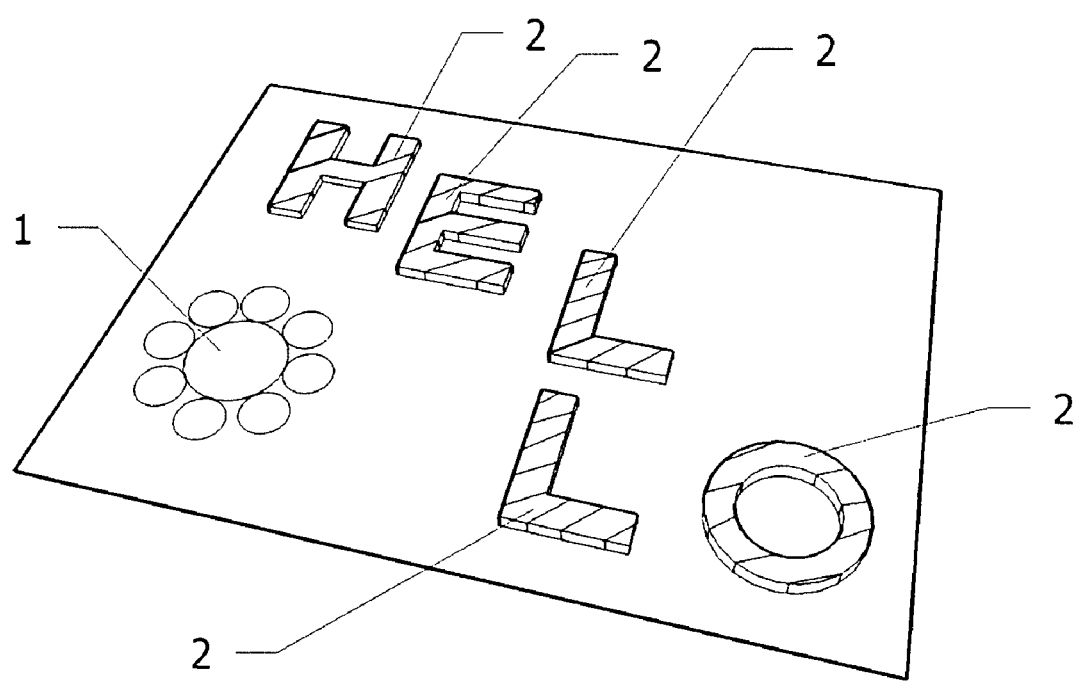
FIG. 1 is an enhanced image showing an image and physical enhancements and indicating graphical enhancements to the physical enhancements with cross hatching and outlines.

FIG. 1 shows an enhanced image with an image 1 and physical enhancements 2. Physical enhancements 2 show graphical enhancements complimentary to the physical enhancements such as a fill color and outline having the same form and dimensions as the physical enhancements and indicated by outlines and cross hatching on physical enhancements 2. The arrangement of the image and graphical enhancements in the virtual design forms a virtual graphic. The virtual graphic printed to a sheet material is a printed image. A custom die applies physical enhancements to the printed image under application of a predetermined force. Custom dies are assembled from preexisting enhancement components and assembly components in accordance with an assembly template derived from the virtual design.

Under application of a predetermined force enhancement components plastically deform the sheet material and thereby impart raised areas in the forms of textures, letters and geometric shapes to the printed image. Assembly components provide a supporting structure for enhancement components and have geometries such that sheet material can be held at a predetermined location relative to the assembly components geometries and dimensions.

The computer based design environment is hosted on a computer. The computer is operationally connected to peripherals such as a display device, a pointing device, printer, a keyboard and the like. The computer includes a processor, random access memory, read only memory and one or more storage devices such as a hard drive. The memory, hard drives and the like are computer-readable media. The method is not limited to any type of computer and may be PC compatible, Apple, or the like. The computer system has at least one operating system running such as Windows, Mac-OS, Unix or the like. The computer may be communicatively connected to the Internet or other network such as an Intranet or the like. The hard-drives and printer may be local to the computer or accessed via the Internet or other network. The computer executes a computer program locally, or on a remote server using a local client to communicate with the remote server over the Internet or other network, and thereby provides the computer based design environment. The computer program or client may be resident within a browser such as those delivered by Microsoft and the like and may be coded as a Java applet or the like, or may be coded to execute within the operating system using programming languages such as c++, Visual Basic and the like.

The computer based design environment has a graphical user interface being controlled through the pointing device and keyboard and the like, and is operationally connected to the printer. The display device allows a user of the computer based design environment to view and change information through the graphical user interface. The graphical user interface includes a screen pointer, such as supported by versions of Microsoft Windows and the like, controlled from the pointing device and keyboard. Pointing devices include, but are not limited to, a mouse, trackballs, remote controls, and touch pads. The pointing device and keyboard allows the user to interact with the computer based design environment using pull down menus such as those supported by Microsoft applications, enter textual characters, and select, manipulate, move and position virtual objects such as geometric shapes displayed in the graphical user interface as would be used in computer based graphical design or computer aided design applications. In one embodiment the computer based design environment includes image enhancement algorithms and tools, graphical drawing tools, and three dimensional rendering algorithms. The printer allows the virtual graphic to be printed to sheet material to create the printed image. The computer based design environment is preferably a what-you-see-is-what-you-get (WYSIWYG) type program, thereby showing the user a preview of exactly what will be printed to the sheet material in the graphical user interface, and other facets of the virtual design.

The computer based design environment is not limited to any computer, display, network, operating system, pointing device, programming environment or style. Computers, displays, pointing devices, printers, operating systems, storage devices and programming strategies for delivering computer based design environments with interactive graphical user interfaces are well understood and should be obvious to one skilled in the art.

A library of virtual objects is made available to the user within the computer based design environment and are displayed, selected, moved and manipulated through the graphical user interface. The user therein selects and arranges desirable assemblies of virtual objects and interacts with the virtual objects making selections from predetermined configuration options to develop the virtual design. The library of virtual objects may be created within the computer based design environment, imported from local storage devices or from remote servers over a network such as the Internet.

Virtual objects include but are not limited to representations of preexisting or preconceived physical objects and, where appropriate, their actions on other physical objects. Virtual objects include, but are not limited to, representations of sheet materials and enhancement components, or are purely virtual objects such as digital photographs.

Some virtual objects representing preexisting physical objects have integral functionality beyond just representation of physical dimensions and forms of corresponding physical objects. Such virtual objects also represent, but are not limited to representing, dimensions and forms of actions performed by the physical object on other physical objects, and complementary actions not directly attributable to the physical object. For example, a virtual enhancement component may represent, but is not limited to representing, form and dimensions of an enhancement component, forms and dimensions of the physical enhancements as would be imparted to the sheet material by the enhancement component, and graphical enhancements as would be complimentary to the physical enhancements and form part of the printed image but are not directly imparted to the sheet material by the enhancement component. Such graphical enhancements are selected during development of the virtual design from predetermined options. Graphical enhancements include but are not limited to one or more geometric shapes outlining or being otherwise complimentary to the form of the physical enhancement, and fill colors applied to the area bounded by the outlines of the geometric shapes. Graphical enhancements and images selected during the design process are printed to the sheet material to create the printed image, and physical enhancements are subsequently applied to the printed image by the enhancement components. Techniques for creating, manipulating and managing virtual objects in a computer based design environment and interacting with them through a graphical user interface are well known and should be obvious to one skilled in the art.

Figure 2:
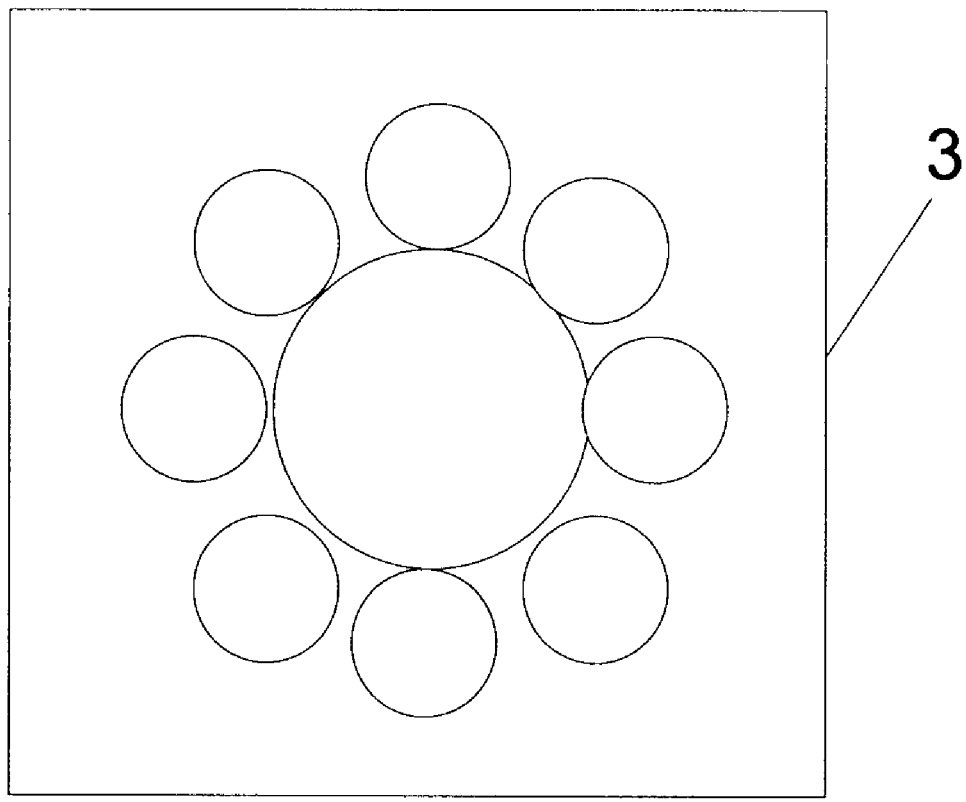
FIG. 2 is a virtual image

FIG. 2 shows a virtual image corresponding to the image 1 of FIG. 1 with an image perimeter 3 indicating the extent of the image. Virtual images are virtual objects. The dimensions and position of a virtual image in the printed image are determined during development of the virtual design. Digital photographs, graphical designs developed within a computer based application and the like would be used as the virtual image.

Figure 3:
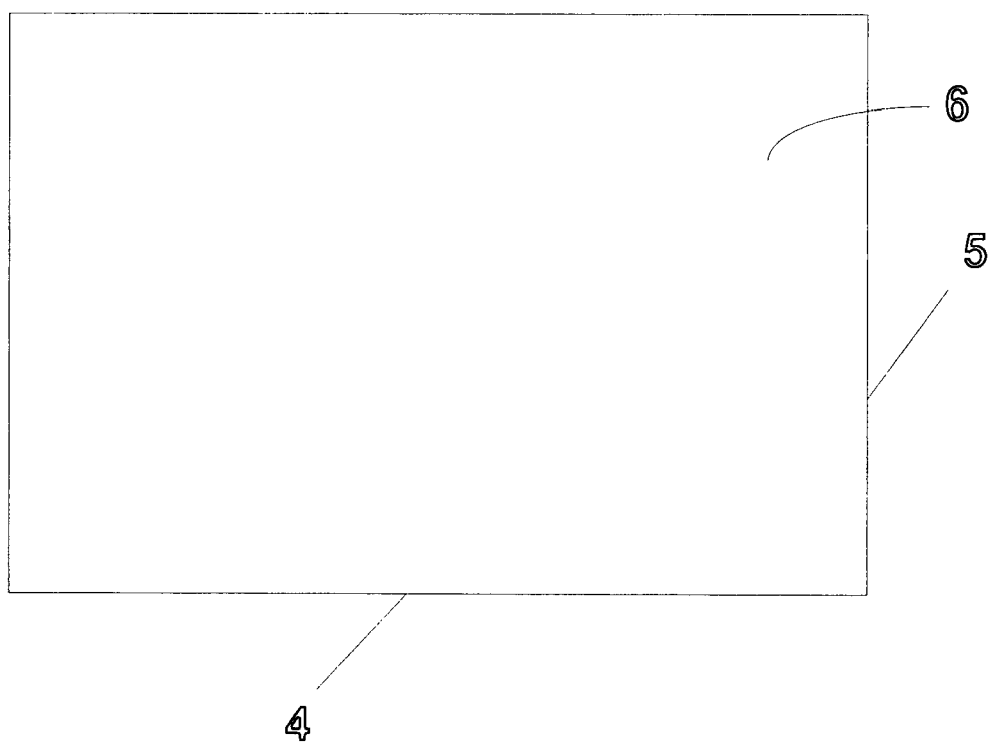
FIG. 3 is a sheet material and indicates its length, width and sheet area.

FIG. 3 shows a sheet material having a sheet length 4, sheet width 5 and a sheet area 6. A virtual sheet material has a virtual sheet length and a virtual sheet width and is a scaled representation of the sheet material within the computer based design environment. A virtual sheet area represents the sheet area 6 and defines a virtual design space. Virtual enhancement components and virtual images are assembled within the virtual design space to create the virtual design and thereby form the virtual graphic and simultaneously a virtual assembly template. The virtual assembly template is a map of the locations of the virtual enhancements components in the virtual design space in accordance with the associated virtual representations of the physical enhancements and graphical enhancements.

Figure 4:
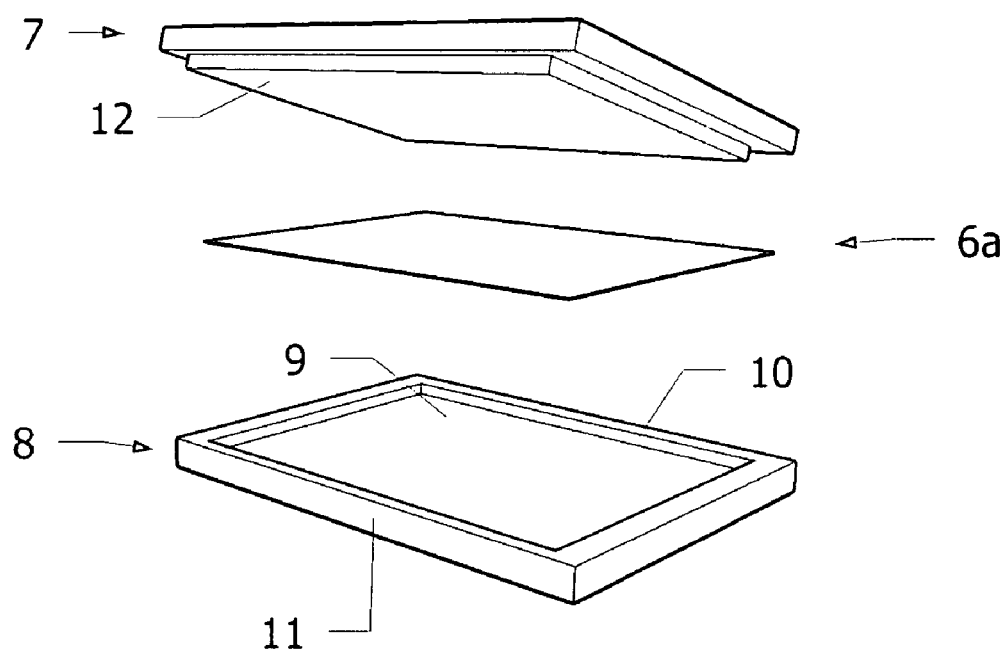
FIG. 4 shows a mating pair of assembly components and a sheet material.

In one embodiment assembly components form matching pairs. FIG. 4 shows a male assembly component 7, a female assembly component 8 and a sheet material 6a. A recess 9 has dimensions sufficient to precisely accommodate the sheet material 6a in a layered arrangement and thereby at a predetermined location relative to the male assembly component 7. The degrees of rotational symmetry of the sheet material 6a determine the positional options in the plane of the sheet material at the predetermined location. The presence of the printed image on the sheet material in general limits the positional options one. Recess 9 has a depth 10 and female assembly component 8 has thickness 11. Raised area 12 on the male assembly component 7 is precisely accommodated by recess 9. Sheet material 6a seated in recess 9 in a layered arrangement is sandwiched between male assembly component 7 and female assembly component 8 by locating raised area 12 in recess 9, and is thereby precisely positioned and held at a predetermined location relative to the arrangement of male assembly component 7 and female assembly component 8. In one embodiment the thickness of the sheet material 6a is negligible when compared with dimensions of the recess 9, depth 10 and thickness 11. The presence of sheet material 6a in recess 9 in such an embodiment does not cause a significant offset in the sandwich arrangement of male assembly component 7 and female assembly component 8. In another embodiment clearances may be provisioned in the dimensioning of the raised area 12 and recess 9 for sheet material 6a thickness. It should be evident that geometries and dimensions of assembly components are specific to a given sheet material 6a such that the sheet material can be located and held at the predetermined location.

Figure 5:
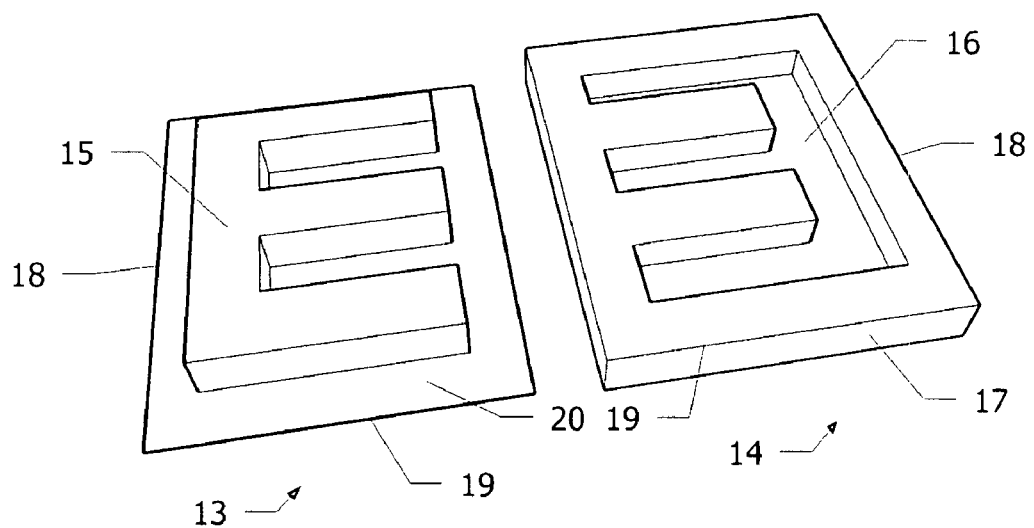
FIG. 5 shows a mating pair of enhancement components

Physical enhancements are imparted to a sheet material using enhancement components assembled and co-joined with assembly components. In one embodiment enhancement components co-joined with assembly components are applied to the sheet material in matching pairs to create the physical enhancements. FIG. 5 shows one embodiment of a male enhancement component 13 and a female enhancement component 14. Male enhancement component 13 has a male impression 15 of a physical enhancement, and female enhancement component 14 has a complementary female impression 16 of the physical enhancement. Female enhancement component 14 has a base thickness 17 equal to the difference between thickness 11 and depth 10 in FIG. 4, and has enhancement component length 18 and enhancement component width 19. Male enhancement component 13 has a base 20, and enhancement component length 18 and enhancement component width 19, these being equal to those of female enhancement component 14. In one embodiment base 20 has a thickness less than that of the sheet material such as to avoid base 20 ghosting or otherwise imparting a physical impression to the sheet material. Male impression 15 and female impression 16 are matched such that a sheet material sandwiched between them under application of the predetermined force is plastically deformed and the physical enhancement is thereby imparted to the sheet material. Techniques for enhancement component design, including the use of beveled edges, clearances and the like are well understood and should be obvious to one skilled in the art.

Figure 6:
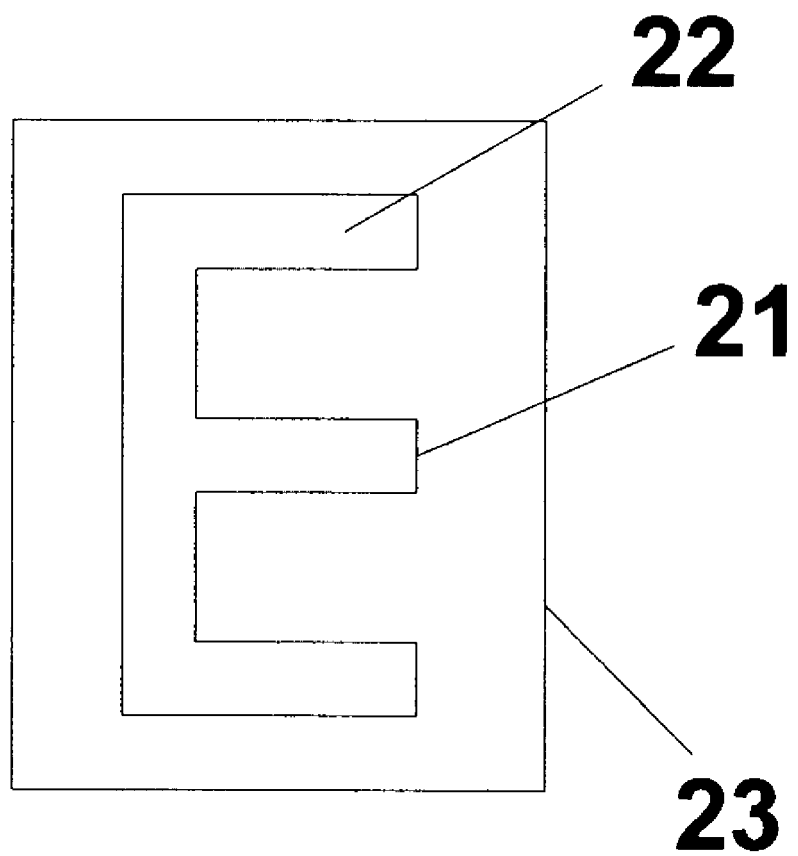
FIG. 6 is a representation of a virtual enhancement component as would be incorporated into a virtual design.

FIG. 6 illustrates one embodiment of a virtual enhancement component as would represent the male enhancement component 13 and female enhancement component 14 of FIG. 5 in the graphical user interface. The virtual enhancement component is a scaled representation of the form and dimensions of the physical enhancement as would be imparted to the sheet material, and also represents the dimensions of the outside edges of the enhancement components shown as enhancement component length 18 and enhancement component width 19 in FIG. 5, and also represents graphical enhancements as would be complimentary to the physical enhancements imparted to the sheet material selected from predetermined, options accessed through the graphical user interface. The outline 21 and enclosed area 22 represent the form and dimensions of the physical enhancement as would be imparted to the sheet material. Recalling that the male enhancement component 13 and female enhancement component 14 share common enhancement components lengths. 18 and enhancement component widths 19, the boundary 23 thereby represents the outside edges of the base 20 and also the outside edges of the female enhancement component 14 in FIG. 5, and thereby the form and dimensions of the enhancement component as represented by the virtual enhancement component. In one embodiment boundary 23 dictates the allowed proximity of virtual enhancement components within the virtual design space and thereby avoiding a virtual design requiring an equivalent arrangement of enhancement components wherein two or more components overlap. The application of such rules typically known as design control rules within a computer based design environment is well understood and would be obvious to one skilled in the art. Graphical enhancements as would be complementary to the physical enhancements and form part of the printed image are selected from predetermined options using palettes and menus integral to the virtual enhancement components and accessed through the graphical user interface. In one embodiment access to menus and palettes associated with the graphical enhancement for a virtual enhancement component is granted in a manner equivalent to that supported by Microsoft applications and the like by using a pointing device such as a mouse to position the screen pointer over the virtual enhancement in the graphical user interface and activating a button on the pointing device. Options therein are selected using the screen pointer and a second button on the pointing device. With reference to FIG. 6 graphical enhancements may include, but are not limited to, selection of line thickness and color for outline 21, and fill color for enclosed area 22. Palettes, menus and other option control tools as would be associated with virtual objects in a computer based design environment and accessed and through pointing devices, keyboards and the like are well understood and would be obvious to one ordinarily skilled in the art. Techniques for reproducing a graphical design displayed in a graphical user interface on a sheet material including equivalent positioning of lines and geometric shapes, colors, line thicknesses and the like using Inkjet Printers, Laser Printers and the like are well known and would similarly be understood by one ordinarily skilled in the art. The invention is not limited to any pointing device, keyboard, method or technique for accessing and using palettes, menus and the like to select graphical enhancement options associated with virtual enhancement objects, or to specific printer drivers, printer hardware and the like as would be used to print equivalent colors and line thickness to a sheet material.

FIG. 7 shows a male assembly component 7, a female assembly component 8 and a plurality of enhancement components 24, 25, 26, 27, 28, 29, 30, 31, 32 & 33. The enhancement components form the following matching male and female pairs in a manner equivalent to the male enhancement component 13 and female enhancement component 14 of FIGS. 5: 24 & 29, 25 & 30, 26 & 31, 27 & 32, and 28 & 33. In one embodiment each pair has an equivalent virtual enhancement component as described above with reference to FIG. 6. FIG. 7a shows a representation of virtual objects as would be used in a virtual design and made available through the graphical user interface. The virtual enhancement components 24a, 25a, 26a & 28a are used to represent the form and dimensions of the enhancement component pairs 24 & 29, 25 & 30, 26 & 31, 27 & 32 and 28 & 33, the form and dimensions of the physical enhancements as would thereby be imparted to the sheet material, and allow selection of the form and dimensions of the graphical enhancements as would be complimentary to the physical enhancements and printed to the sheet material. Virtual enhancement component 26a represents the pairs 26 & 31 and 27 & 32, these pairs being identical enhancement components. The virtual enhancement component 26a would have two instances within the virtual design and require two instances of the same enhancement component as suggested by the enhancement components shown in FIG. 7. The virtual sheet material 6b is shown and the virtual enhancement components 24a, 25a, 26a & 28a are represented within the computer based design environment using a common scale and coordinate system. The virtual image 1a is dimensionless and can be resized within the virtual design. The virtual sheet material 6b defines the virtual design space within which the other virtual enhancement components and virtual images are arranged to form the virtual design.

FIG. 7b shows one embodiment of the graphical user interface. The pull down menus 90 are used to control the application, and function in a manner equivalent to those used in Microsoft applications and the like for opening and saving files, updating libraries and the like. The pull down menus 90 illustrated are exemplary and should not be taken as defining or limiting the menus as would be made available. The component library 91 contains virtual enhancement components, the materials library 92 contains virtual sheet materials and the images library 93 contains virtual images. Slide controls 97 are available for each library to allow a user to scroll through the objects in the libraries in a manner equivalent to that used in Microsoft applications, web browsers and the like. The screen pointer 96 is controlled by the pointing device and is used to operate the pull down menus 90 and select virtual objects from the libraries. On initiating a virtual design a virtual sheet material is selected from the materials library materials 92 using the screen pointer 96. This appears as the virtual design space 6b in the graphical user interface with a boundary 6c and is a scaled representation of the sheet material on which the enhanced image will be manifest including dimensions, texture, fill color and the like. Virtual enhancement components are selected from the components library 91 using the screen pointer 96 and positioned in the virtual design space with drag and drop type functionality as would be used in Microsoft Visio, computer aided design and computer based graphical design applications. The virtual enhancement component 24a is shown desirably positioned and having a fill color selected from predetermined options for the enclosed area 44 indicated by cross hatching. The outline of the enclosed area 44 indicates the form of the physical enhancement and also that a line thickness and line color has been similarly selected. The perimeter 34 represents the form and dimensions of the enhancement component represented by the virtual enhancement component, and thereby indicates the position and dimensions of the enhancement component relative to the sheet material and thereby relative to the predetermined location. Virtual enhancement components represent preexisting or preconceived enhancement components and in one embodiment the dimensions and form of the physical enhancement as would manifest on the sheet material is selected from predetermined options corresponding to preexisting or preconceived components. As an example, a virtual enhancement component representing a textual character may present options for differing sizes and styles of characters corresponding to preexisting or preconceived enhancement components rather than the computer based design environment providing a unique virtual enhancement component for each option or combination thereof. After selection of the desirably dimensioned and styled character from the predetermined options it would appear scaled and styled in the graphical user interface. The virtual enhancement component 25b is shown in a desirable location and is a copy of virtual enhancement component 25c selected from the component library 91 and desirably placed in the virtual design space. The menu 94, accessed using the screen pointer 96 and pointing device, presents the predetermined options for dimensions, fill color, line color and line thickness. Other predetermined options may be made available as would be obvious to one skilled in the art. The secondary menu 95 is shown illustrating how the predetermined line thickness options for the outline of the graphical enhancement as would be complimentary to the physical enhancement would be selected. The user makes and confirms selections from the predetermined options using the screen pointer 96 and the pointing device. The method is not limited by any menu structure, sets of predetermined options and the like. Virtual images from the image library 93 are similarly selected and positioned. Virtual images do not represent any physical object and as such can be sized without restriction within the virtual design space. Presentation of libraries of objects, and selection, drag and drop functionality within a graphical user interface as used within computer aided design and computer based graphical design applications is well known and should be obvious to one skilled in the art.

The manner of using the method to create an enhanced design is illustrated in the flow chart FIG. 8. At Step 210 libraries of virtual enhancement components and virtual sheet materials are created or imported to the computer based design environment. At step 220 one or more virtual images are loaded or created, an example is shown as FIG. 2. At step 230 virtual sheet material, virtual enhancement components and virtual images are selected from the libraries. In one embodiment sheet material fill color represented by the virtual sheet material provides a background color for the virtual design space and virtual graphic. At step 240 virtual images and virtual enhancement components are assembled in a desirable arrangement within the virtual design space using the graphical user interface, and graphical enhancements are selected from predetermined options presented by the virtual enhancement components. The position of a virtual enhancement component in the virtual design space simultaneously represents the positions of the represented physical enhancements on the sheet material, the positions of the represented graphical enhancements on the sheet material, and the positions of the represented enhancement components on the assembly components in accordance with the predetermined location. A virtual design is thereby created. In one embodiment graphical enhancements are defaulted to the fill color of the virtual sheet material. This being equivalent to imparting a physical enhancement to the sheet material with no associated graphical enhancements. The virtual design provides the virtual graphic and the virtual assembly template custom to the virtual graphic. FIG. 9 illustrates one embodiment of the virtual design as might be displayed by the graphical user interface using the virtual objects shown in FIG. 7a. Image perimeter 3 is shown indicating the position and size of the virtual image 1a within the virtual design space and represents it size and location in the printed image. Perimeters 34, 35, 36, 37 & 38 represent boundaries of the virtual enhancement components and show their placement within the virtual design space. In one embodiment perimeters 34, 35, 36, 37 & 38 are equivalent to the outside edges of base 20 in FIG. 5 as represented by boundary 23 in FIG. 6. This arrangement of perimeters forms a scaled representation of an arrangement of equivalent enhancement components on the sheet area 6 shown in FIG. 3 and forms the virtual assembly template printed to a sheet of the sheet material to form the assembly template for the male assembly component 7 of FIG. 7. Outlines 39, 40, 41, 42 & 43 and enclosed areas 44, 45, 46, 47 & 48 show the form, dimensions and positions of the physical enhancements as would be imparted to the sheet material by the equivalent enhancement components arranged and co-joined with the assembly components in accordance with the assembly template. Enclosed areas 44, 45, 46, 47 & 48 are cross hatched indicating selection of fill color from the predetermined options presented by the virtual enhancement components. Line thickness and color for outlines 39, 40, 41, 42 & 43 are similarly selected. The graphical enhancement options selected for the outlines 39, 40, 41, 42 & 43 and enclosed areas 44, 45, 46, 47 & 48, and the virtual image 1a form the virtual graphic. FIG. 10 shows one embodiment of the virtual graphic, as would be displayed in the graphical user interface and printed to the sheet material. The virtual graphic previews the printed image and all forms, dimensions and positions being scaled equivalents to those as would manifest in the printed image. In one embodiment rendering algorithms provide a simulated three dimensional view of the enhanced image from the virtual design. Techniques for creating and displaying such simulations are well understood and would be obvious to one skilled in the art.

At step 250 of FIG. 8 the virtual graphic of FIG. 10 is printed to a sheet of the sheet material to create the printed image. At step 260 the assembly template is created by printing the virtual assembly template to one or more sheets of the sheet material. In one embodiment the printed image and assembly template are manifest on sheet material of the same dimensions. The male assembly template is created by printing the virtual design shown as FIG. 9 to a sheet of the sheet material, and a female assembly template is created by printing a complimentary image of the virtual design to a sheet of the sheet material. FIG. 11 shows the male assembly template 49, female assembly template 50, printed image 51, male assembly component 7, and female assembly component 8. Perimeters 34, 34a, 35, 35a, 36, 36a, 37, 37a, 38 & 38a show where the boundaries of the corresponding enhancement components will be positioned on the male assembly template 49 and female assembly template 50. Perimeters 34, 35, 36, 37 & 38 are representative of the boundaries of the males of the enhancement components and 34a, 35a, 36a, 37a & 38a are representative of boundaries of the females of the enhancement components At step 270 the assembly templates are affixed to the assembly components. FIG. 12 shows the male assembly template 49 affixed to the male assembly component 7, and the female assembly template 50 affixed to the female assembly component 8 to form a male die master 52 and a female die master 53. The male assembly template 49 is affixed to the raised area 12 and the female assembly template 50 is affixed in the recess 9 shown in FIG. 11. Also shown are the printed image 51 and the enhancement components 24, 25, 26, 27, 28, 29, 30, 31, 32 & 33. At step 280 the custom die is assembled in accordance with the assembly templates as affixed to the assembly components. FIG. 13 shows the enhancement components 24, 25, 26, 27 & 28 affixed to male die master 52 to create the male die half 54. Material is removed from the female assembly component 53 in accordance with the affixed female assembly template 50 thereby creating a series of voids in the female die master 53 bounded by the perimeters 34a, 35a, 36a, 37a & 38a. FIG. 14 shows the enhancement components 29, 30, 31, 32 & 33 located in the voids and affixed to create a female die half 55. The base thickness 17 of the females of the enhancement components 29, 30, 31, 32 & 33 being equal to the difference between thickness 11 and depth 10 as shown in FIGS. 4 & 5 ensures that the enhancement components are seated and flush with the floor of the recess 9 such that the form of the boundaries of the enhancement components or the edges of the voids created in the female die master 53 do not contribute ghosting or similar physical impressions to the sheet material. In an embodiment wherein the thickness of a sheet material is not negligible compared with the thickness 11 and depth 10 dimensions may be adjusted in accordance with the thickness of the sheet material to ensure flush seating. A custom die is thereby formed.

In tests plastic and cardboard were used as materials to construct the assembly components and enhancement components, and methods of affixing the enhancement components to the assembly components included glue and sticky tape. Material was removed from the female die master using a scalpel. Other materials, tools and assembly techniques may be used and would be obvious to one skilled in the art.

At step 290 of FIG. 8 a predetermined force is applied to the custom die in its closed position, with the raised area 12 located in the recess 9, the printed image thereby being sandwiched between the male die half 54 and female die half 55 such as to push the raised area 12 in the recess 9, and thereby impart the enhancement pattern to the printed image. Techniques for applying a predetermined force to execute an embossing or die cutting action with the use of embossing or die cutting devices including the use of platens, rollers, and the like are well known and should be obvious to one skilled in the art. FIG. 15 shows male die half 54 and female die half 55 with the printed image 51 placed between them prior to seating in the recess 9. The printed image 51 is shown positioned such that the graphical enhancements in the printed image 51 and enhancement components assembled into the male die half 54 and female die half 55 share a common orientation. The male die half 54 and female die half 55 are brought together such that the raised area 12 is seated within the recess 9, and the printed image 51 is thereby held in place at the predetermined location. The graphical enhancements on the printed image 51 are thereby in alignment with the enhancement components assembled into the assembly components to form the male die half 54 and female die half 55. On application of the predetermined force the physical enhancements are imparted to the printed image 51. FIG. 16 shows the enhanced image 56 after application of the predetermined force and separating the male die half 54 and female die half 55, this being the enhanced image of FIG. 1.

In tests the Microsoft applications Visio and Print.Net were used as the computer based design environment and graphical user interface, virtual enhancement components were created within these applications using their integral functionalities to correspond to physical components constructed from cardboard and plastic. Other software applications are available and could be used, and a custom application can be written using techniques and algorithms that are well understood, and would be obvious to one skilled in the art. The method is not limited to any computer based design environment, graphical user interface and the like.

Second Embodiment

FIGS. 3, 8, 9, 10, 11, 12, 13 & 17

In one embodiment the female die half 55 of FIG. 15 is a resilient female die half and used with the male die half 54. Referring to FIGS. 11, 12 & 13, the male assembly template 49 is affixed to the male assembly component 7 to create the male die master 52 and the enhancement components 24, 25, 26, 27 & 28 are affixed to create the male die half 54. The female die half 55 is replaced with the resilient female die half 57 shown in FIG. 17. The resilient female die half 57 has a recess such that it can precisely accommodate the raised area 12 of the male die half and the printed image 51, and has a floor 58 made of a resilient material such that during application of the predetermined force the floor deforms and assumes a female impression of the male die half 54. Materials such as Neoprene, Gum Rubber and Silicone with Durometer ratings in the range 30 to 60 have found to be suitable for the floor 58 but other materials may be used as would be obvious to one skilled in the art.

The manner of using the method is described in the flowchart of FIG. 8. At step 210 libraries of virtual enhancement components and virtual sheet materials are imported to the computer based design environment. At step 220 one or more virtual images are loaded to the computer based design environment. At step 230 the user selects virtual sheet material, virtual enhancement components and virtual images from the libraries. At step 240 virtual images and virtual enhancement components are assembled in a desirable arrangement within the virtual design space using the graphical user interface, and graphical enhancements associated with virtual enhancement components such as fill colors and line thicknesses are selected from predetermined options presented by the virtual enhancement components through the graphical user interface with color pallets and pull-down menus and the like. The virtual design is thereby created. The virtual design provides a virtual graphic and a virtual assembly template customized to the virtual graphic. FIG. 9 illustrates one embodiment of the virtual design as might be displayed by the graphical user interface. Image perimeter 3 is shown indicating the position and relative dimensions of the virtual image 1a within the virtual design space and represents its dimensions and location in the printed image. Perimeters 34, 35, 36, 37 & 38 represent boundaries of the virtual enhancement components and show their form, placement and dimensions within the virtual design space. In one embodiment this is a scaled representation of an identical arrangement of equivalent enhancement components on the sheet area 6 shown in FIG. 3 and forms the virtual assembly template printed to a sheet of the sheet material to form the assembly template for the male assembly component 7 of FIG. 11. Outlines 39, 40, 41, 42 & 43 and enclosed areas 44, 45, 46, 47 & 48 show the form and dimensions of the physical enhancements as would be imparted to the sheet material by the enhancement components. Enclosed areas 44, 45, 46, 47 & 48 are shown cross hatched indicating a fill color has been selected from predetermined options. Line thickness and colors for outlines 39, 40, 41, 42 & 43 are similarly selected. The selected line thicknesses and colors for the outlines 39, 40, 41, 42 & 43, and colors for the enclosed areas 44, 45, 46, 47 & 48 and virtual image 1a form the virtual graphic. The virtual graphic is printed to a sheet of the sheet material thereby forming the printed image. FIG. 10 shows one embodiment of the virtual graphic as would be displayed in the graphical user interface and is a scaled preview of the printed image. All forms, dimensions and positions are scaled equivalent of those as would be manifest in the printed image. At step 250 of FIG. 8 the virtual graphic of FIG. 10 is printed to a sheet of the sheet material to create the printed image. At step 260 the virtual assembly template is printed to a sheet of the sheet material as used for the printed image to create the male assembly template 49 shown in FIG. 11. At step 270 the male assembly template 49 is affixed to the male assembly component 7 shown in FIG. 11 to create the male die master 52 in FIG. 12. At step 280 the custom die is assembled in accordance with the assembly template. The enhancement components 24, 25, 26, 27 & 28 are affixed to the male die master 52 of FIG. 12 to create the male die half 54 of FIG. 13. At step 290 the printed image 51 is oriented and located in the recess of the resilient female die half 57 of FIG. 17 such as to be in layered contact with the floor 58 and thereby at the predetermined location. The raised area 12 is located within the recess with the affixed enhancement components oriented to be in alignment with their associated graphical enhancements in the printed image. The printed image is sandwiched between the floor 58 and enhancement components affixed to the raised area 12 of the male die half 54 and is thereby held at the predetermined location. A predetermined force is applied to the sandwich arrangement by pushing the raised area 12 into the recess 9 such that the floor 58 deforms and takes a complementary form of the male die half 54 and the physical enhancements are thereby imparted to the printed image. Techniques for applying the predetermined force including the use of embossing and die cutting devices with planar platens or roller arrangements are well known and should be obvious to one skilled in the art Third Embodiment FIGS. 8, 15, 18, 19, 19a, 20, 21 & 22

In one embodiment the enhancement components have geometries that interlock and are assembled with assembly components having complementary geometries. FIG. 18 shows a plurality of enhancement components, a physical enhancement component 59 is used to impart a physical enhancement to the sheet material, and filler components 60 form a supporting structure in conjunction with the assembly components. Enhancement components are provided having a plurality of enhancement forms, dimensions and geometric features such that they can be assembled in multiple configurations. Enhancement components have common tongue 63 and groove 64 features such that they precisely and easily interlock. Enhancement components are assembled into an assembly frame shown in FIG. 19. The assembly frame 61 has an arrangement of frame tongues 65 and frame grooves 66 complementary to the tongues 63 and grooves 64 of the enhancement components. An assembly frame closure 62 has a complementary arrangement of frame grooves and frame tongues and completes the framing of the enhancement components to create a male die half 54a as shown in FIG. 20. The assembly frame 61 and assembly frame closure 62 have dimensions and geometries such that the sheet material can be precisely accommodated in a layered arrangement at a predetermined location relative to the assembly frame 61 and assembly frame enclosure 62 as assembled. This is illustrated in FIG. 19a wherein an assembly template 49a is shown seated in the assembly frame 61 prior to assembly with the assembly frame closure 62. In FIG. 20 the male die half 54a is shown assembled from the physical enhancement component 59 and filler components 60 positioned in the assembly frame 61 in accordance with the assembly template 49a and locked in place with assembly frame closure 62. A resilient female die half 57a has a recess such that it can precisely accommodate the raised area consisting of the physical enhancement component 59 and filler components 60 of the male die half 54a, and has a floor 58a made of a resilient material. The recess has dimensions such that it can precisely accommodate the printed image 51a in a layered arrangement with the floor 58a at the predetermined location.

The graphical enhancements manifest on the printed image 51a are aligned with the features of the enhancement component 59 by positioning the printed image 51a in a layered arrangement with the floor 58a and positioning the raised area formed by the enhancement component 59 and filler components 60 in the recess having the floor 58a such that the graphical enhancements on the printed image 51a and the features of the enhancement component 59 are in the same orientation. The printed image is thereby held at the predetermined location assuring accurate application of the physical enhancement to the graphical enhancements.

The resilient material forming the floor 58a has mechanical properties such that during application of the predetermined force it deforms and assumes an equivalent female impression of the male die half 54a. Materials such as Neoprene, Gum Rubber and Silicone with Durometer ratings in the range 30 to 60 have found to be suitable for the floor 58a, but other materials may be used as would be obvious to one skilled in the art.

The virtual design is developed within the computer based design environment with the enhancement components represented as virtual enhancement components. FIG. 21 illustrates one embodiment of a virtual design showing a representation of the placement of the physical enhancement component 59 and the enhancement fillers 60 as would be presented in the graphical user interface. FIG. 21 shows two copies of the virtual image 1a indicating that the virtual image 1a can be manifest in any position and multiple times within a virtual design space defined by the virtual sheet material. FIG. 22 indicates the form and relative dimensions of the physical enhancement regions 67, 68, 69, 70 & 71 represented by the virtual enhancement component for which fill colors, and line thickness and colors are selected by the user for complementary areas of graphical enhancement using the graphical user interface. FIG. 22 represents the virtual graphic as would be printed to the sheet material to form the printed image.

The manner of using the method is shown in the flow chart FIG. 8. At step 210 the libraries of virtual enhancement components and virtual sheet materials are imported to the computer based design environment. At step 220 one or more virtual images are loaded to the computer based design environment. At step 230 a virtual sheet material, virtual enhancement components and virtual images are selected from the library. The virtual sheet material defines the virtual design space. At step 240 virtual images and virtual enhancement components are assembled in a desirable arrangement within the virtual design space using the graphical user interface. FIG. 21 shows one embodiment of the virtual design as would be presented in the graphical user interface and indicates the virtual representation of the locations of the physical enhancement component 59 and enhancement fillers 60 as would form the virtual assembly template. The virtual design space is shown fully populated with virtual enhancement components as would be the condition such that the male die half 54a if FIG. 20 can be properly assembled. The virtual image 1a is shown duplicated in two locations within the virtual design space. FIG. 22 shows the enhancement regions 67, 68, 69, 70 & 71 representing the form and relative dimensions of the physical enhancements as would be imparted to the sheet material and for which graphical enhancements complimentary to the physical enhancements are selected from predetermined options. Graphical enhancements are selected using pull down menus and color palettes associated with the virtual enhancement components and accessed through the graphical user interface. Graphical enhancements include but are not limited to fill colors, and outline thickness and color. The virtual graphic is formed by the occurrences of the virtual image la and the selected graphical enhancements. On completion of the virtual design and at step 250 the virtual graphic is printed to the sheet material to create the printed image 51a. At step 260 the virtual assembly template is printed to a sheet of the same size as the sheet material used for the printed image to create the assembly template. FIG. 21 shows the form of the assembly template in one embodiment. At step 270 the assembly template 49a is affixed to the assembly component frame 61 as shown in FIG. 19a. At step 280 the male die half 54a is assembled in accordance with the assembly template. The physical enhancement component 59 and enhancement fillers 60 are assembled with the assembly frame 61 and assembly frame closure 62 using the tongue 63 and groove 64 arrangement of the enhancement components and the complementary frame tongue 65 and frame groove 66 arrangement of the assembly frame 61 and assembly frame closure 62. The male die half 54a is shown in FIG. 20. At step 290 the printed image 51a is oriented as shown in FIG. 20 and seated in the recess of the resilient female die half 57a in layered contact with the floor 58a. The raised area formed by the physical enhancement component 59 and enhancement fillers 60 is located within the recess thereby sandwiching the printed image 51a between the die male half 54a and the resilient female die half 57a at the predetermined location. A predetermined force is applied to the sandwich arrangement using an embossing or die cutting device such that the male die half 54a is pushed into the resilient female die half 57a and the floor 58a deforms and takes a complementary form of the male die half 54a and the physical enhancements are thereby imparted to the printed image. The use of embossing devices to apply a predetermined force and execute an embossing action is well known and would be obvious to one skilled in the art.

In one embodiment a female die half is constructed in an equivalent manner to the male die half 54a such that a complementary female die half is realized in a manner equivalent to the embodiment of FIG. 15 and used in the manner shown in the flowchart of FIG. 8.

Fourth Embodiment

FIGS. 23, 24, 25, 26 & 27

In one embodiment the assembly components are integral with the enhancement components.

In FIG. 23 enhancement components have a male half 72 and a female half 73. The male half has a male impression 74 and the female half has a female impression 75. The male half has a raised area 12a and the female half has a recess 9a. The recess 9a has dimensions such that it can precisely accommodate a sheet material of a specific size in a layered arrangement at a predetermined location. The raised area 12a has dimensions such that it can be precisely accommodated by the recess 9a with the male impression 74 and female impression 75 in a common orientation. Sheet material seated in recess 9a is sandwiched between the male die half 72 and female die half 73 by positioning the raised area 12a in recess 9a with the male impression 74 and female impression 75 in the same orientation. The sheet material is thereby positioned and held at a predetermined location relative to the male impression 74 and female impression 75. Under application of the predetermined force the sheet material is plastically deformed and the physical enhancements thereby imparted. Techniques for enhancement component design, including the use of beveled edges and clearances, are well understood and should be obvious to one skilled in the art.

Virtual enhancement components represent enhancement components within a computer based design environment and are accessed and displayed through the graphical user interface. Sheet materials are similarly represented as virtual sheet materials. The graphical user interface of the computer based design environment is used to develop the virtual design wherein virtual enhancement components contribute representations of physical enhancements as would be imparted to the sheet material and graphical enhancements complementary to the physical enhancements such as outlines and fill colors. Graphical enhancements merged with virtual images form the virtual graphic which is printed to the sheet material to create the printed image. The virtual graphic is a scaled preview of the printed image.

FIG. 24 shows one embodiment of the virtual enhancement component associated with the male half 72 and female half 73 overlaid with a virtual image 1a repeated multiple times and in differing sizes as would represent a virtual design in the graphical user interface. The enhancement outlines 76, 77, 78, 79 & 80 and enhancement regions 81, 82, 83, 84 & 85 represent the form and dimensions of the physical enhancement as would be imparted to the sheet material by the enhancement component. Fill colors are selected from predetermined options for enhancement regions 81, 82, 83, 84 & 85 and are indicated by cross hatching, and line thicknesses and colors are similarly selected for the enhancement outlines 76, 77, 78, 79 & 80. The options selected for enhancement outlines 76, 77, 78, 79 & 80 and the enhancement regions 81, 82, 83, 84 & 85 are the graphical enhancements complimentary to the physical enhancements represented by the virtual enhancement component.

FIG. 25 shows one embodiment of the virtual graphic as would be presented in the graphical user interface and printed to the sheet material to create the printed image. The printed image is oriented such that the graphical enhancements are in the same orientation and in alignment with the male impression 74 and female impression 75 as shown in FIG. 27 and seated in the recess 9a and sandwiched with the male enhancement component by placing the raised area 12a in the recess 9a. A predetermined force is applied to the sandwich arrangement such that the raised area 12a is pushed into recess 9a thereby imparting the physical enhancements to the printed image in alignment with the graphical enhancements. Techniques for applying a predetermined force the rough the use of embossing devices is well known and should be obvious to one skilled in the art.

The method flowchart is shown as FIG. 26. At step 310 the libraries of virtual enhancement components are imported to the computer based design environment. At step 320 one or more virtual images are imported to the computer based design environment. At step 330 a virtual sheet material, virtual enhancement components and virtual images are selected. Virtual enhancement components are specific to the virtual dimensions of the virtual sheet material. At step 340 the graphical enhancements associated with the virtual enhancement component are selected from the predetermined options and the virtual images desirably positioned to complete the virtual design. The virtual design has an associated virtual graphic. At step 350 the virtual graphic is printed to the sheet material to create the printed image. At step 360 the printed image is oriented and placed in a layered arrangement within the recess 9a. FIG. 27 shows the printed image oriented and positioned prior to seating in the recess 9a of the female die half 73 and the subsequent insertion of the raised area 12a of the male die half 72 into the recess 9a. The raised area 12a is seated within the recess 9a such that the male impression and female impression are in alignment and a predetermined force is applied thereby imparting the impression to the printed image.

Fifth Embodiment

In one embodiment the virtual enhancement components represent the form and dimensions of the physical enhancements as would be imparted to the sheet material by the represented enhancement component, the form and dimensions of the graphical enhancements complimentary to the physical enhancements as would be printed to the sheet material, and the form and dimensions of the enhancement component in a manner such as can be converted to operational instructions for a computer controlled milling machine, a rapid laser sintering machine as used for rapid prototyping such as provided by 3D Systems Inc. or the like. The enhancement components are thereby preconceived components. The virtual design is assembled through the graphical user interface as supported by the computer based design environment by positioning the virtual enhancement components within the virtual design space defined by the virtual sheet material. A virtual graphic is thereby provided and printed to the sheet material. The virtual assembly template is passed to a transformation program to combine the representations of the enhancement components and their locations within the virtual design space, and virtual representations of the assembly components appropriate to the sheet material dimensions, and generate operational code such as to control the computer controlled milling machine or rapid laser sintering device or the like such as to manufacture the custom die. The resulting custom die has the enhancement components positioned relative to the predetermined location indicated on and integral to the geometry of the assembly components. The use of computer controlled milling machines, rapid laser sintering devices and the like for rapidly and cost effectively manufacturing three dimensional geometric shapes from metals, plastics and the like are well known and should be obvious to one skilled in the art. Techniques for generating operational code as would be used for computer controlled milling machines, rapid laser sintering devices and the like for assemblies of virtual components in computer aided design environment is well known and should be similarly obvious to one skilled in the art.

FIG. 28 shows an enhancement component 87 as would be represented by a virtual enhancement component, an assembly component 88 as would be represented by a virtual assembly component, and a male die half 89 as would be produced using a computer controlled milling machine or rapid laser sintering device or the like controlled by operational code generated from the virtual design by the transformation program. The male die half 89 would be used with a resilient female die half 57 as shown in FIG. 17.

FIG. 29 is a method flow chart. At step 410 the libraries of virtual enhancement components and sheet materials are loaded to the computer based design environment. At step 420 a virtual sheet material is selected such as to define the virtual design space, and virtual enhancement components are selected. At step 430, using the graphical user interface the virtual enhancement components are arranged within the virtual design space and graphical enhancements selected from predetermined options to create the virtual design. The virtual graphic and the virtual assembly template are thereby defined. At step 440 the virtual graphic is printed to a sheet of the sheet material to create the printed image. At step 450 the virtual assembly template is supplied to the transformation program with the associated virtual enhancement components and the virtual assembly components and merged to create a control program for the computer controlled milling machine or rapid laser sintering device or similar. At step 460 the control program is loaded to the computer controlled milling machine or rapid laser sintering device or similar and the custom die is manufactured. At step 470 the printed image is oriented and arranged in a sandwich arrangement with the custom die and a predetermined force applied to impart the physical enhancements to the printed image.

In one embodiment a male die half 54 and female die half 55 equivalent in structure to the configuration shown in FIG. 15 would be manufactured such as to produce a custom die with complimentary impressions.

In one embodiment virtual images are provided representing images as would be incorporated into the virtual design and enhanced image.

Other Embodiments

From the above it should be understood that the embodiments described are exemplary and modifications and changes may be made to the method by one skilled in the art without departing from the spirit of the method. In other embodiments the position of graphical enhancements are offset from the physical enhancements and the virtual enhancement components provide functionality for resizing them relative to the physical enhancement dimensions. Recesses and raised areas on the assembly components may be replaced with inscribed grids, mounting corners, and the like to ensure placement of the printed images and assembly templates at a predetermined location. Virtual enhancement components, sheet materials and assembly components may be represented in the computer based design environment by virtual objects in three dimensions, and simulations of sheet material deformations may be incorporated to create a three dimensional simulation of the enhanced image. Additional enhancement objects such as glitter, ribbons, preexisting die cut shapes and the like may also be incorporated into the virtual design. Freeform graphics may be supported by the graphical user interface. Die cut components can be used such as to cut out shapes from the sheet material rather than impart raised areas. Multiple cavities may also be used thereby allowing multiple impressions to be executed within each cycle, and the means of positioning the sheet material at a predetermined location adapted to accommodate webbed materials.

SUMMARY AND CONCLUSIONS

Virtual designs are developed in a computer based design environment having a graphical user interface through which a user selects, locates and manipulates scaled assemblies of virtual objects representing images, sheet materials, enhancement components and their associated physical enhancements and associated graphical enhancements complimentary to the physical enhancements to create a virtual design. The virtual design is a scaled representation of the printed image and also a coordinated assembly of enhancement components in an arrangement as would be used to apply the physical enhancements to the printed image. Enhancement components and sheet materials are preexisting physical objects or preconceived objects for which the manufacturing process is predefined. Enhancement components impart a known physical enhancement to a sheet material. The images and graphical enhancements represented in the virtual design are printed to a sheet of the sheet material, for which it is specifically designed, to create the printed image. Physical enhancements are imparted to the printed image using enhancement components assembled with assembly components in accordance with an assembly template derived from the virtual design. Assembly components have features integral to their geometry such that sheet material can be positioned and held at a predetermined location. Enhancement components are positioned and affixed to the assembly components in accordance with the assembly template and thereby positioned in accordance with the predetermined location. When the printed image is oriented and located at the predetermined location the enhancement components assembled into the assembly components are in positions relative to the images and graphical enhancements of the printed image as determined during the virtual design. Physical enhancements thereby imparted to the printed image are at positions relative to the images and graphical enhancements as determined during development of the virtual design.

It should be evident through the embodiments described that custom designs for enhanced images can be rapidly developed and cost effectively executed. Enhancement components may be reused across multiple designs and new enhancement components and their virtual equivalents can be developed as needed and incorporated into designs, thereby removing the need to develop a custom die from scratch for each new design.

Although the descriptions above contain specifications, these should not be construed as limiting the scope of the embodiments but as merely providing illustrations of some of the presently preferred embodiments Thus the scope of the embodiment should be determined by the appended claims and their legal equivalents, rather than by the examples given.

I claim:

1. A method for creating an enhanced image manifest on a sheet material, said enhanced image having one or more images, physical enhancements and graphical enhancements as would be complimentary to said physical enhancements, said method comprising:

providing a plurality of enhancement components and assembly components, said assembly components having geometries and dimensions such that a sheet of said sheet material is accommodated and held at a predetermined location, and said enhancement components having dimensions and geometries such that when assembled and co-joined with said assembly components and under application of a predetermined force said physical enhancements are imparted to sheet material accommodated and held at said predetermined location;

providing a plurality of virtual objects comprising virtual enhancement components, virtual sheet materials and virtual images as would be used in a computer based design environment having one or more functions such as to allow a user therein to develop an arrangement of said virtual objects through a graphical user interface such as to provide a virtual design representing said enhanced image, wherein said virtual enhancement components represent, in combination, the forms and dimensions of said enhancement components, the forms and dimensions of said physical enhancements thereby imparted to said sheet material, and the forms and dimensions of said graphical enhancements complimentary to said physical enhancements as would be imparted to said sheet material using a printer operationally connected to a computer hosting said computer based design environment, and said virtual sheet materials representing forms and dimensions of said sheet materials, and said virtual images representing said images;

providing said computer and said computer based design environment, and said user therein arranging said virtual objects into a virtual design using said graphical user interface, said virtual design being a scaled representation of said enhanced image comprising one or more of said virtual enhancement components and one or more of said virtual images positioned within a virtual design space defined by said virtual sheet material, and said virtual design providing a virtual graphic and a virtual assembly template, said virtual graphic being a preview of said virtual images and said graphical enhancements represented by said assembly of virtual objects as would be printed to a sheet of said sheet material, said virtual assembly template being the assembly of said virtual enhancement components as would be transformed and printed to one or more sheets of said sheet material specifically indicating forms, dimensions and positions of said enhancement components on said assembly components relative to said predetermined location such as would be used to impart said physical enhancements to said sheet material in accordance with said virtual design;

printing said virtual graphic to a sheet of said sheet material such that said images and graphical enhancements are manifest, thereby creating a printed image;

printing said virtual assembly template to one or more sheets of said sheet material thereby creating an assembly template;

arranging said assembly template with said assembly components in accordance with said predetermined location and assembling and co-joining said enhancement components and said assembly components in accordance with said assembly template;

locating said printed image at said predetermined location in a sandwich arrangement with said assembly components and said co-joined enhancement components such that said graphical enhancements in said printed image and said enhancement components assembled and co-joined with said assembly components have common orientation;

applying said predetermined force to said sandwich arrangement and thereby imparting said physical enhancements to said printed image such that said enhanced design is manifest on said sheet material.

2. The method of claim 1 wherein said computer based design environment is resident and executing on said computer.

3. The method of claim 1 wherein said computer based design environment is resident and executing on a remote server and is communicatively connected over a network to a client providing said graphical user interface on said computer.

4. The method of claim 1 wherein said computer based design environment has a WYSISWG graphical user interface.

5. The method of claim 1 wherein said virtual enhancement components and said virtual sheet material are represented within a common scale and coordinate system.

6. The method of claim 1 wherein said assembly components have mating raised areas and recesses forming and indicating said predetermined location.

7. The method of claim 1 wherein said graphical enhancements and said physical enhancements represented by said virtual enhancement components are selected from predetermined options.

8. The method of claim 1 wherein said graphical enhancements represented by said virtual enhancement components are defaulted to the fill color of said virtual sheet material.

9. A method for designing and producing an enhanced image on a sheet material comprising physical enhancements, and graphical enhancements printed to said sheet material to be complimentary to said physical enhancements, said method comprising:
  providing a plurality of virtual objects, said virtual objects comprising a virtual sheet material, one or more virtual enhancement components and one or more virtual assembly components, said virtual sheet material being a scaled representation of the form and dimensions of said sheet material and thereby defining a virtual design space, each of said virtual enhancement components being, in combination, scaled representations of the form and dimensions of one or more of said physical enhancements, and the form and dimensions of an enhancement component as would be used to impart said physical enhancements to said sheet material when combined with assembly components and under application of a predetermined force, and the form and dimensions of said graphical enhancements as would be complimentary to said physical enhancements and printed to said sheet material, said enhancement components being preexisting or preconceived, said virtual assembly components being scaled representations of the form and dimensions of assembly components as would form a supporting structure for said enhancement components and having geometries and features such that said sheet material is precisely accommodated and held at a predetermined location;
  providing a computer based design environment having a graphical user interface and one or more functions such as to allow a user therein to desirably select and position one or more of said virtual enhancement components within said virtual design space and thereby develop a virtual design, wherein said virtual enhancement components simultaneously represent said physical enhancements, said graphical enhancements, and said enhancement components in accordance with the position of said virtual enhancement component in said virtual design space, said virtual design being a virtual representation of said enhanced image and providing a virtual graphic and a virtual assembly template, said virtual graphic being a preview of said graphical enhancements as would be printed to said sheet material, said virtual assembly template being a scaled representation of the arrangement of said enhancement components as would be used in combination with said assembly components and said predetermined force to impart said physical enhancements to said sheet material;
  printing said virtual graphic to said sheet material thereby providing a printed image;
  providing a custom die comprising said enhancement components represented in said virtual design and said assembly components arranged in accordance with said virtual assembly template transformed such as to provide precise assembly instructions dictating placement of said enhancement components on said assembly components, said enhancement components thereby being positioned on said assembly components in accordance with and relative to said predetermined location;
  locating said printed image at said predetermined location in a sandwich arrangement with said custom die such that said graphical enhancements and said enhancement components have common orientation;
  applying said predetermined force to said sandwich arrangement and thereby imparting said physical enhancements to said printed image such that said enhanced design is manifest on said sheet material.

10. The method of claim 9 wherein said computer based design environment has a WYSISWG graphical user interface.

11. The method of claim 9 wherein said virtual enhancement components and said virtual sheet material are represented within a common scale and coordinate system.

12. The method of claim 9 wherein said assembly components have mating raised areas and recesses forming and indicating said predetermined location.

13. The method of claim 9 wherein said graphical enhancements represented by said virtual objects are selected from predetermined options.

14. The method of claim 9 wherein said graphical enhancements represented by said virtual objects are defaulted to the fill color of said sheet material as would be represented by said virtual sheet material.

15. The method of claim 9 wherein said custom die assembled using preexisting enhancement components and said assembly components as are also preexisting.

16. The method of claim 9 wherein said custom die are assembled using manufacturing means controlled by transformational code derived from said virtual design.

* * * * *